US012769193B2

(12) United States Patent
Lee et al.

(10) Patent No.: US 12,769,193 B2
(45) Date of Patent: Oct. 20, 2026

(54) ROBOT FOR PROJECTING IMAGE AND METHOD FOR PROJECTING IMAGE THEREOF

(71) Applicant: SAMSUNG ELECTRONICS CO., LTD., Suwon-si (KR)

(72) Inventors: Jaeha Lee, Suwon-si (KR); Dohoon Kim, Suwon-si (KR); Yeonjun Lee, Suwon-si (KR); Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/020,167

(22) Filed: Jan. 14, 2025

(65) Prior Publication Data

US 2025/0172859 A1 May 29, 2025

Related U.S. Application Data

(63) Continuation of application No. PCT/KR2024/017080, filed on Nov. 1, 2024.

(30) Foreign Application Priority Data

Nov. 28, 2023 (KR) ........................ 10-2023-0168658

(51) Int. Cl.
*H04N 9/31* (2006.01)
*G03B 21/12* (2006.01)
(Continued)

(52) U.S. Cl.
CPC ............. *G03B 21/12* (2013.01); *G03B 29/00* (2013.01); *G05D 1/246* (2024.01); *G05D 2111/10* (2024.01)

(58) Field of Classification Search
CPC ........ H04N 9/31; H04N 9/3173; G03B 21/12; G03B 29/00; G05D 1/246; G05D 2111/10
(Continued)

(56) References Cited

U.S. PATENT DOCUMENTS 10,893,245 B1 1/2021 Choi et al.
11,191,526 B2 12/2021 Shin
(Continued)

FOREIGN PATENT DOCUMENTS

JP 2007 229855 A 9/2007
JP 2022-21544 A 2/2022
(Continued)

OTHER PUBLICATIONS

Communication dated Feb. 12, 2025, issued by the International Searching Authority in International Application No. PCT/KR2024/017080 (PCT/ISA/210 and PCT/ISA/237).

*Primary Examiner* — Trang U Tran
(74) *Attorney, Agent, or Firm* — Sughrue Mion, PLLC

(57) ABSTRACT

A robot includes: a projector; a sensor; memory storing instructions; and one or more processors, wherein the instructions that, when executed by the one or more processors, cause the robot to: identify candidate projection areas based on first information obtained by sensing surroundings of a user via the sensor; identify a priority order of the candidate projection areas; control the projector to: project a first image at an area including the candidate projection areas, based on positions of the candidate projection areas and the priority order; and display second information on the priority order at the candidate projection areas; identify a candidate projection area selected based on a user input from among the candidate projection areas as a projection area; and project image content at the projection area via the projector.

18 Claims, 25 Drawing Sheets

(51) Int. Cl.

| | |
|---|---|
| ***G03B 29/00*** | (2021.01) |
| ***G05D 1/246*** | (2024.01) |
| *G05D 111/10* | (2024.01) |

(58) Field of Classification Search
USPC .......................................................... 348/744
See application file for complete search history.

(56) References Cited

U.S. PATENT DOCUMENTS

| | | | | |
|---|---|---|---|---|
| 11,219,837 | B2 * | 1/2022 | Rico | B25J 9/046 |
| 11,417,135 | B2 * | 8/2022 | Suzuki | G06V 40/18 |
| 11,601,627 | B2 | 3/2023 | Makita | |
| 12,248,325 | B2 * | 3/2025 | Orlov | G05D 1/43 |
| 2019/0099681 | A1 | 4/2019 | Rico et al. | |

FOREIGN PATENT DOCUMENTS

| | | | |
|---|---|---|---|
| KR | 10-1472278 | B2 | 12/2014 |
| KR | 10-1515179 | B1 | 4/2015 |
| KR | 10-2017-0142820 | A | 12/2017 |
| KR | 10 2018 0003269 | A | 1/2018 |
| KR | 10-2020-0012410 | A | 2/2020 |
| KR | 10 2020 0092481 | A | 8/2020 |
| KR | 10 2336246 | B1 | 12/2021 |
| KR | 10-2023-0029038 | A | 3/2023 |
| KR | 10-2656563 | B1 | 4/2024 |

* cited by examiner

ROBOT FOR PROJECTING IMAGE AND METHOD FOR PROJECTING IMAGE THEREOF

CROSS-REFERENCE TO RELATED APPLICATIONS

This application is a by-pass continuation application of International Application No. PCT/KR2024/017080, filed on Nov. 1, 2024, which is based on and claims priority to Korean Patent Application No. 10-2023-0168658, filed on Nov. 28, 2023, in the Korean Intellectual Property Office, the disclosures of which are incorporated by reference herein in their entireties.

BACKGROUND

1. Field

The disclosure relates to a robot for projecting an image and a method for projecting the image thereof.

2. Description of Related Art

A robot may autonomously travel by detecting a surrounding environment in real-time based on a sensor, a camera, and the like, and collecting information in addition to repetitive functions.

The robot described above is currently being used in numerous fields, and is providing various services through interactions with users.

SUMMARY

According to an aspect of the disclosure, a robot includes: a projector; a sensor; memory storing instructions; and one or more processors, wherein the instructions that, when executed by the one or more processors, cause the robot to: identify a plurality of candidate projection areas based on first information obtained by sensing surroundings of a user via the sensor; identify a priority order of the plurality of candidate projection areas; control the projector to: project a first image at an area including the plurality of candidate projection areas, based on a plurality of positions of the plurality of candidate projection areas and the priority order; and display second information on the priority order at the plurality of candidate projection areas; identify a candidate projection area selected based on a user input from among the plurality of candidate projection areas as a projection area; and project image content at the projection area via the projector.

The one or more processors may be configured to execute the instructions to cause the robot to: identify, based on the plurality of positions, a plurality of areas of a second image to be projected in the area, the plurality of areas corresponding to the plurality of candidate projection areas; and control the projector to project the second image. The second image may include a plurality of sub images corresponding to the plurality of areas, and the plurality of sub images may include a plurality of indicators corresponding to the priority order.

The plurality of indicators may include a plurality of numbers indicating the priority order.

The one or more processors may be configured to execute the instructions to cause the robot to: identify, based on the plurality of positions, a plurality of areas corresponding to the plurality of candidate projection areas; and control the projector to consecutively project a plurality of sub images corresponding to the plurality of areas. The plurality of sub images may include a plurality of indicators corresponding to the priority order. The plurality of indicators may include a plurality of numbers indicating the priority order.

The one or more processors may be configured to execute the instructions to cause the robot to identify the priority order based on: a plurality of sizes of the plurality of candidate projection areas, and a plurality of distances between the user and the plurality of candidate projection areas.

The one or more processors may be configured to execute the instructions to cause the robot to: generate a 3-dimensional map of the surroundings based on the first information; identify a plane from the surroundings based on the 3-dimensional map; identify a plurality of areas with a first aspect ratio matching a second aspect ratio of a projection image on the plane; and identify the plurality of candidate projection areas from among the plurality of areas based on a characteristic of the plurality of areas.

The one or more processors may be configured to execute the instructions to cause the robot to identify a remaining area excluding an identified area from among the plurality of areas as the plurality of candidate projection areas. A saturation of the identified area may be greater than or equal to a threshold value, and the identified area may be determined based on a RGB value of a plurality of points in the plurality of areas.

The one or more processors may be configured to execute the instructions to cause the robot to: obtain a third image via the sensor; identify a position of the user in the third image; identify a rotation angle range of the sensor based on the position of the user and a field of view of the sensor; and obtain the first information via the sensor while the sensor rotates within the rotation angle range.

The one or more processors may be configured to execute the instructions to cause the robot to: obtain a bounding box for the user based on the third image; identify a pixel distance between a center pixel of the third image and a pixel of the bounding box; and identify the rotation angle range based on a focal distance of the sensor and the pixel distance.

According to an aspect of the disclosure, a method for projecting an image by a robot including a projector, includes: identifying a plurality of candidate projection areas based on first information obtained by sensing surroundings of a user via a sensor; identifying a priority order of the plurality of candidate projection areas; projecting a first image, via the projector, at an area including the plurality of candidate projection areas, based on a plurality of positions of the plurality of candidate projection areas and the priority order; displaying second information on the priority order at the plurality of candidate projection areas; identifying a candidate projection area selected based on a user input from among the plurality of candidate projection areas as a projection area; and projecting image content at the projection area via the projector.

The displaying may include: identifying, based on the plurality of positions, a plurality of areas of a second image to be projected in the area, the plurality of areas corresponding to the plurality of candidate projection areas; and controlling the projector to project the second image. The second image may include a plurality of sub images corresponding to the plurality of areas, and the plurality of sub images may include a plurality of indicators corresponding to the priority order.

The plurality of indicators may include a plurality of numbers indicating the priority order.

The displaying may include: identifying, based on the plurality of positions, a plurality of areas corresponding to the plurality of candidate projection areas; and controlling the projector to consecutively project a plurality of sub images corresponding to the plurality of areas. The plurality of sub images may include a plurality of indicators corresponding to the priority order.

The plurality of indicators may include a plurality of numbers indicating the priority order.

The identifying the priority order may include identifying the priority order based on: a plurality of sizes of the plurality of candidate projection areas, and a plurality of distances between the user and the plurality of candidate projection areas.

The identifying the plurality of candidate projection areas may include: generating a 3-dimensional map of the surroundings based on the first information; identifying a plane from the surroundings based on the 3-dimensional map; identifying a plurality of areas with a first aspect ratio matching a second aspect ratio of a projection image on the plane; and identifying the plurality of candidate projection areas from among the plurality of areas based on a characteristic of the plurality of areas.

The identifying the plurality of candidate projection areas may include identifying a remaining area excluding an identified area from among the plurality of areas as the plurality of candidate projection areas. A saturation of the identified area may be greater than or equal to a threshold value, and the identified area may be determined based on a RGB value of a plurality of points in the plurality of areas.

The obtaining the first information may include: obtaining a third image via the sensor; identifying a position of the user in the third image; identifying a rotation angle range of the sensor based on the position of the user and a field of view of the sensor; and obtaining the first information via the sensor while the sensor rotates within the rotation angle range.

According to an aspect of the disclosure, a non-transitory computer-readable recording medium having instructions recorded thereon, that, when executed by one or more processors of a robot including a projector, cause the robot to: identify a plurality of candidate projection areas based on first information obtained by sensing surroundings of a user via a sensor; identify a priority order of the plurality of candidate projection areas; control the projector to: project a first image at an area including the plurality of candidate projection areas, based on a plurality of positions of the plurality of candidate projection areas and the priority order; and display second information on the priority order at the plurality of candidate projection areas; identify a candidate projection area selected based on a user input from among the plurality of candidate projection areas as a projection area; and project image content at the projection area via the projector.

BRIEF DESCRIPTION OF THE DRAWINGS

The above and other aspects, features, and advantages of certain embodiments of the present disclosure are more apparent from the following description taken in conjunction with the accompanying drawings, in which.

DETAILED DESCRIPTION

Figure 1A:
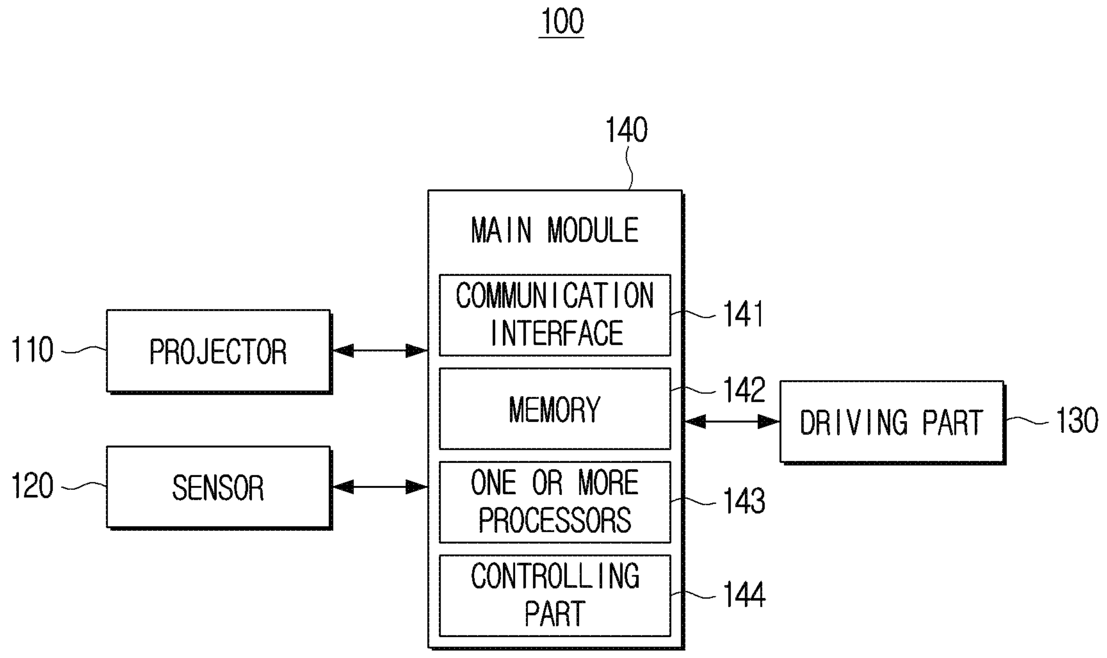
FIG. 1A and FIG. 1B are block diagrams illustrating a configuration of a robot according to one or more embodiments.

The embodiments described in the disclosure, and the configurations shown in the drawings, are examples of embodiments, and various modifications may be made without departing from the scope and spirit of the disclosure.

Terms used in the disclosure will be briefly described, and the disclosure will be described in detail. In the disclosure, an expression "at least one of a, b or c" may refer to "a", "b", "c", "a and b", "a and c", "b and c", "all of a, b, and c", or modifications thereof.

The terms used in the disclosure are terms selected that are currently widely used considering their function herein. However, the terms may change depending on intention, legal or technical interpretation, emergence of new technologies, and the like of those skilled in the related art. Further, in some cases, there may be terms arbitrarily selected, and in this case, the meaning of the term will be described in greater detail in the corresponding description. Accordingly, the terms used herein are not to be understood as its designation but based on the meaning of the term and the overall context of the disclosure.

A singular expression includes a plural expression, unless otherwise specified. Terms used herein including technical or scientific terms may have the same meaning as those commonly understood by a person of ordinary skill in the art to which the disclosure pertains. In addition, terms that include ordinal numbers such as 'first' or 'second' used in the disclosure may be used in describing various elements, but the elements are not to be limited by the terms. The terms may be used only for the purpose of distinguishing one element from another element.

Throughout the disclosure, when a portion is described as "including" to another portion, the above may mean that another element may be further included rather than excluding the another element, unless otherwise specified. In addition, terms such as "part" or "module" described in the disclosure may mean a unit that processes at least one function or operation, and the above may be implemented with a hardware or software, or implemented with a combination of hardware and software.

The term "and/or" may include a combination of a plurality of associated elements described or any element from among the plurality of associated elements described.

Meanwhile, the various elements and areas of the drawings have been schematically illustrated. Accordingly, the technical spirit of the disclosure is not limited by relative sizes and distances illustrated in the accompanied drawings.

In the disclosure, text may be obtained based on a voice signal for a user voice, and a process of obtaining information on a user intent based on text may be performed by an artificial intelligence model. The artificial intelligence model may be implemented in a form of an on-device included in a robot. However, the above is not limited thereto, and the artificial intelligence model may be stored in a server connected with the robot. If the artificial intelligence model is stored in the server, the robot may transmit the voice signal for the user voice to the server, and receive information on the user intent or a control command according to the user intent from the server.

The disclosure relates to a robot configured to determine a projection area from user surroundings taking into consideration a characteristic of an area in the user surroundings, project an image at the projection area, and provide various image content to a user and a method for projecting an image by the robot.

Embodiments will be described in detail with reference to the accompanying drawings below to aid in the understanding of a person of ordinary skill in the art to which the disclosure pertains. However, the disclosure may be implemented in various different forms and it should be noted that the disclosure is not limited to the embodiments described herein. Further, in the drawings, like reference numerals may be used to indicate like elements.

The disclosure will be described below with reference to the accompanying drawings.

Figure 1B:
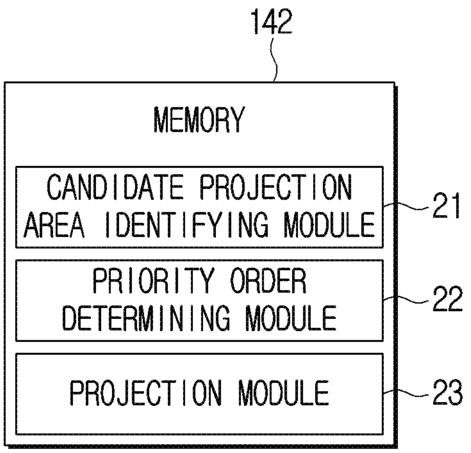

FIG. 1A and FIG. 1B are block diagrams illustrating a configuration of a robot according to one or more embodiments.

Referring to FIG. 1A, a robot 100 may include a projector 110, a sensor 120, a driving part 130, and a main module 140. Meanwhile, the configuration of the robot 100 shown in FIG. 1A is exemplary, and a portion of the configurations may be added according to the embodiment.

The robot 100 according to one or more embodiments may be a robot capable of movement (e.g., a moving-type robot). The robot 100 may be otherwise referred to as an autonomous traveling device, a moving-type device, or the like, but will be described as the robot 100 in the disclosure. The robot 100 moving may include detecting a position of the robot and obstacles by exploring the surroundings, and traveling on its own within a space using the detected information. The space in which the robot 100 moves may include various indoor spaces in which the robot 100 can travel such as, for example, and without limitation, a home, an office, a hotel, a factory, a shop, a supermarket, a restaurant, and the like.

The robot 100 according to one or more embodiments may be implemented into robots of various types. For example, the robot 100 may be implemented as a robot cleaner that performs cleaning while moving within a space, a guide robot that guides a route to the user within the space or provides various information associated with a service being provided within the space or a delivery robot or a serving robot that delivers a loaded product to a location within the space, a moving-type projection device that can project an image while moving in the location, and the like.

The projector 110 may project an image. The image may include a still image and a dynamic image (e.g., a video). The dynamic image may include various visual information indicating a movement of an object using a plurality of consecutive still images. At this time, each of the plurality of still images included in a video may mean a frame (or an image frame).

The projector 110 may project an image at a projection surface using light emitted from a light source. For example, the projector 110 may project an image using a Cathode-Ray Tube (CRT) method, a Liquid Crystal Display (LCD) method, a Digital Light Processing (DLP) method, or a Liquid Crystal on Silicon (LCoS) method. The projection surface may be a separately provided screen, but is not limited thereto, and may be various wall surfaces, one surface of an object, or the like within the space in which the robot 100 moves.

The sensor 120 may be a configuration for sensing various information. One or more processors 143 may obtain various information based on sensing values of the sensor 120. For example, information obtained by the sensor 120 may include an image and depth information. The image may include an RGB value of each of a plurality of pixels included in the image. The depth information may include a depth map including depth values of each of the plurality of pixels.

According to one or more embodiments, the sensor 120 may include a stereo camera. The sensor 120 may include an RGB-D camera. The sensor 120 may include an RGB camera and a Light Detection And Ranging (LiDAR) sensor. However, the embodiment is not limited thereto, and the sensor 120 may include various sensors with which an image and depth information may be obtained.

The driving part 130 may control a movement of the robot 100. For example, the driving part 130 may move the robot 100, or stop the robot 100 in movement, and control the movement speed and/or movement direction of the robot 100.

For example, a traveling type of the robot 100 may be a wheel type or a walking type.

The wheel type may mean a method of movement by the robot 100 through a rotation of a wheel. If the robot 100 is a wheel type robot, the robot 100 may include one or more wheels. The driving part 130 may include a device which generates power for rotating the wheels. For example, the driving part 130 may be implemented as a gasoline engine, a diesel engine, a liquefied petroleum gas (LPG) engine, an electric motor, or the like according to fuel (or energy source) used.

The walking type may mean a method in which the robot 100 moves through movement of a leg. If the robot 100 is a walking type (e.g., a two legged walking robot, a three legged walking robot, a four legged walking robot, etc.), the robot 100 may include two or more legs that support the robot 100. The legs may include a plurality of links and joints that connect to the links. The driving part 130 may include a device that generates power to lift or lower the legs by rotating the links based on the joints. For example, the driving part 130 may be implemented as a motor and/or an actuator.

In addition, the driving part 130 may control a movement of one portion of the robot 100. The driving part 130 may be coupled between a first portion (e.g., a body) and a second portion (e.g., a head, an arm, etc.) of the robot 100. The driving part 130 may rotate the second portion. For example, the driving part 130 may be implemented as a motor and/or an actuator.

The main module 140 may be implemented as hardware, and may include a communication interface 141, a memory 142, one or more processors 143, and a controlling part 144.

The communication interface 141 may perform data communication with electronic devices by control of the one or more processors 143. For example, the communication interface 141 may include communication circuitry with which data communication between the robot 100 and the electronic devices can be performed using at least one from among data communication methods which include a wired LAN, a wireless LAN, Wi-Fi, Bluetooth, ZigBee, Wi-Fi Direct (WFD), infrared communication (infrared Data Association (IrDA)), Bluetooth Low Energy (BLE), Near Field Communication (NFC), Wireless Broadband Internet (Wibro), World Interoperability for Microwave Access (WiMAX), Shared Wireless Access Protocol (SWAP), Wireless Gigabit Alliances (WiGig), and RF communication.

The memory 142 may be stored with instructions, data structures, and program codes readable by the one or more processors 143. Operations performed by the one or more processors 143 may be implemented by executing instructions or codes of a program stored in the memory 142.

The memory 142 may include a flash memory type, a hard disk type, a multimedia card micro type, and a memory of a card type (e.g., SD or XD memory, etc.), a non-volatile memory including at least one from among a read-only memory (ROM), an electrically erasable programmable read-only memory (EEPROM), a programmable read-only memory (PROM), a magnetic memory, a magnetic disk, and an optical disk, and a volatile memory such as a random access memory (RAM) or a static random access memory (SRAM).

The memory 142 may store one or more instructions and/or programs for the robot 100 to determine a projection area from the user surroundings and operate to project an image at the projection area. For example, referring to FIG. 1B, the memory 142 may store instructions and/or programs for implementing functions of a candidate projection area identifying module 21, a priority order determining module 22, and a projection module 23. The modules 21, 22, and 23 shown in FIG. 1B may be configurations which are implemented based on the one or more processors 143 executing a program or an instruction stored in the memory 142. Accordingly, operations in which the modules 151, 152, and 153 are described as being performed below may actually be performed by the one or more processors 143.

The one or more processors 143 may control overall operations of the robot 100. For example, the one or more processors 143 may control, by executing the one or more instructions of the program stored in the memory 142, the overall operations for the robot 100 to determine a projection area from the user surroundings, and project an image at the projection area. For example, the one or more processors 143 may perform various calculations for the robot 100 to determine the projection area from the user surroundings, and project the image at the projection area, and transfer a signal associated with the calculation result to the controlling part 144.

The controlling part 144 may control elements of the robot 100. The controlling part 144 may control the elements (e.g., the projector 110, the sensor 120, the driving part 130, etc.) of the robot 100 based on a signal provided from the one or more processors 143. For example, the controlling part 144 may generate a control signal using the signal provided from the one or more processors 143, and provide the control signal to the elements of the robot 100. Accordingly, the elements of the robot 100 may perform an operation corresponding to the calculation result of the one or more processors 143. The controlling part 144 may be implemented as one or more ICs (e.g., a controller IC).

The one or more processors 143 may include one or more from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors 143 may control one or a random combination from among other elements of the robot 100, and perform an operation associated with communication or data processing. The one or more processors 143 may execute one or more programs or instructions stored in the memory 142. For example, the one or more processors 143 may perform, by executing the one or more instructions stored in the memory 142, a method according to one or more embodiments.

When a method according to one or more embodiments includes a plurality of operations, the plurality of operations may be performed by one processor, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a CPU) and the third operation may be performed by a second processor (e.g., an artificial intelligence dedicated processor).

The one or more processors 143 may be implemented as a single core processor that includes one core, or as one or more multicore processors that includes a plurality of cores (e.g., a homogeneous multicore or a heterogeneous multicore). If the one or more processors 143 are implemented as multicore processors, each of the plurality of cores included in the multicore processors may include a memory inside the processor such as a cache memory and an on-chip memory, and a common cache shared by the plurality of cores may be included in the multicore processors. In addition, each of the plurality of cores (or a portion from among the plurality of cores) included in the multicore processors may independently read and perform a program command for implementing a method according to one or more embodiments, or read and perform a program command for implementing a method according to one or more embodiments due to a whole (or a portion) of the plurality of cores being interconnected.

When a method according one or more embodiments includes a plurality of operations, the plurality of operations may be performed by one core from among the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

In one or more embodiments, the processor may refer to a system on chip (SoC), a single core processor, or a multicore processor in which the one or more processors and other electronic components are integrated or a core included in the single core processor or the multicore processor, and the core herein may be implemented as the CPU, the GPU, the APU, the MIC, the DSP, the NPU, the hardware accelerator, the machine learning accelerator, or the like, but one or more embodiments are not limited thereto.

For convenience of description below, the one or more processors 143 may be described as the processor 143.

The processor 143 may identify a plurality of candidate projection areas from the user surroundings by executing the candidate projection area identifying module 21. A candidate projection area may mean an area for an image to be projected from the user surroundings. The candidate projection area identifying module 21 may identify, from among one surfaces of various objects such as a wall surface, a home appliance, furniture, or the like within a space in which the robot 100 is positioned, a flat surface having an area, or a form or color (e.g., saturation), and the like sufficient for a picture of a size to be projected as the candidate projection area. For example, the candidate projection area identifying module 21 may identify a plane from the user surroundings, and identify the plurality of candidate projection areas from the user surroundings taking into consideration a size and color of an area within an aspect ratio and plane of the projection image.

Figure 2:
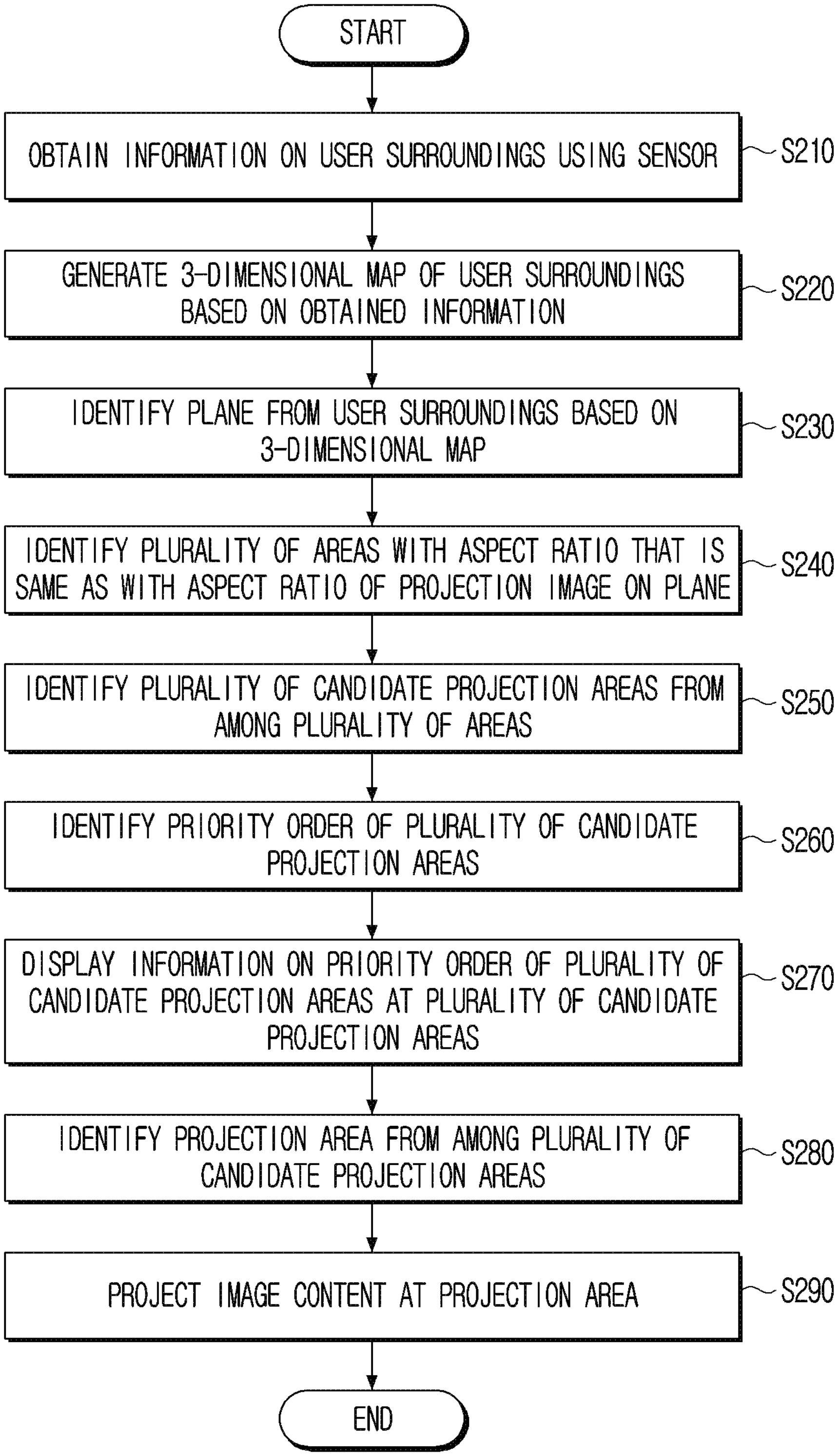
FIG. 2 is a flowchart illustrating a method for projecting an image by a robot according to one or more embodiments.

A more detailed description on the candidate projection area identifying module 21 will be further described in the description of S210, S220, S230, S240, and S250 in FIG. 2.

The processor 143 may identify a priority order of the plurality of candidate projection areas by executing the priority order determining module 22, and provide information on the priority order of the plurality of candidate projection areas to the user.

The priority order may be information designating an order in which the projection areas may be selected from among the plurality of candidate projection areas. For example, the priority order may indicate, when an image is projected at the candidate projection areas, an order of the candidate projection areas by which the projected image is visible to the user.

The priority order determining module 22 may determine the priority order of the plurality of candidate projection areas based on characteristics of the plurality of candidate projection areas. At this time, a characteristic of a candidate projection area may include a size of the candidate projection area and a distance between the user and the candidate projection area.

Further, the priority order determining module 22 may project an image indicating the priority order of each candidate projection area at each of the plurality of candidate projection areas using the projector 110.

The image may include an indicator corresponding to the priority order or the candidate projection areas.

The indicator may include a number or a character indicating the priority order of the candidate projection areas. The character may include a character that marks a number with a language or a character having an order (e.g., alphabet, etc.). The indicator may include various graphic elements that can visually provide the user with information on the priority order of the candidate projection areas using numbers or characters, and may be substituted with expressions such as a graphical user interface (GUI) or icons.

A more detailed description on the priority order determining module 22 will be further described in the description of S260 and S270 in FIG. 2.

The processor 143 may project an image at the projection area by executing the projection module 23. The projection area may mean an area at which an image that is provided to the user is projected. The projection area may be determined from among the plurality of candidate projection areas based on a use00r input. The projection module 23 may project an image at the projection area using the projector 110.

A more detailed description on the projection module 23 will be further described in the description of S290 in FIG. 2.

FIG. 2 is a flowchart illustrating a method for projecting an image by a robot according to one or more embodiments.

Referring to FIG. 2, the processor 143 may obtain information on the user surroundings by sensing the user surroundings using the sensor 120 (S210).

The processor 143 may obtain information by sensing the user surroundings using the sensor 120 while maintaining the user within the field of view (FOV) of the sensor 120.

For example, it may be pre-set such that the projection area is to be determined in the space in which a viewing direction (e.g., a viewing direction of the sensor 120) of the robot 100 is positioned. In this case, in order for the image content projected at the projection area by the robot 100 to be visible to the user, the projection area within a space may be determined based on a position of the user. Accordingly, the robot 100 may sense, to obtain information on the space based on the position of the user, the user surroundings using the sensor 120 while maintaining the user within the field of view of the sensor 120.

The processor 143 may identify a rotation angle range of the sensor 120 for sensing the user surroundings while maintaining the user within the field of view of the sensor 120. Further, the processor 143 may obtain information using the sensor 120 while the sensor 120 is rotating within the rotation angle range.

For example, the processor 143 may obtain an image using the sensor 120, and identify the rotation angle range of the sensor 120 based on the position of the user identified from the image and the field of view of the sensor 120.

The position of the user in the image may include a position of a bounding box for the user. The processor 143 may detect the user from the image, and obtain the bounding box for the user.

Figure 3:
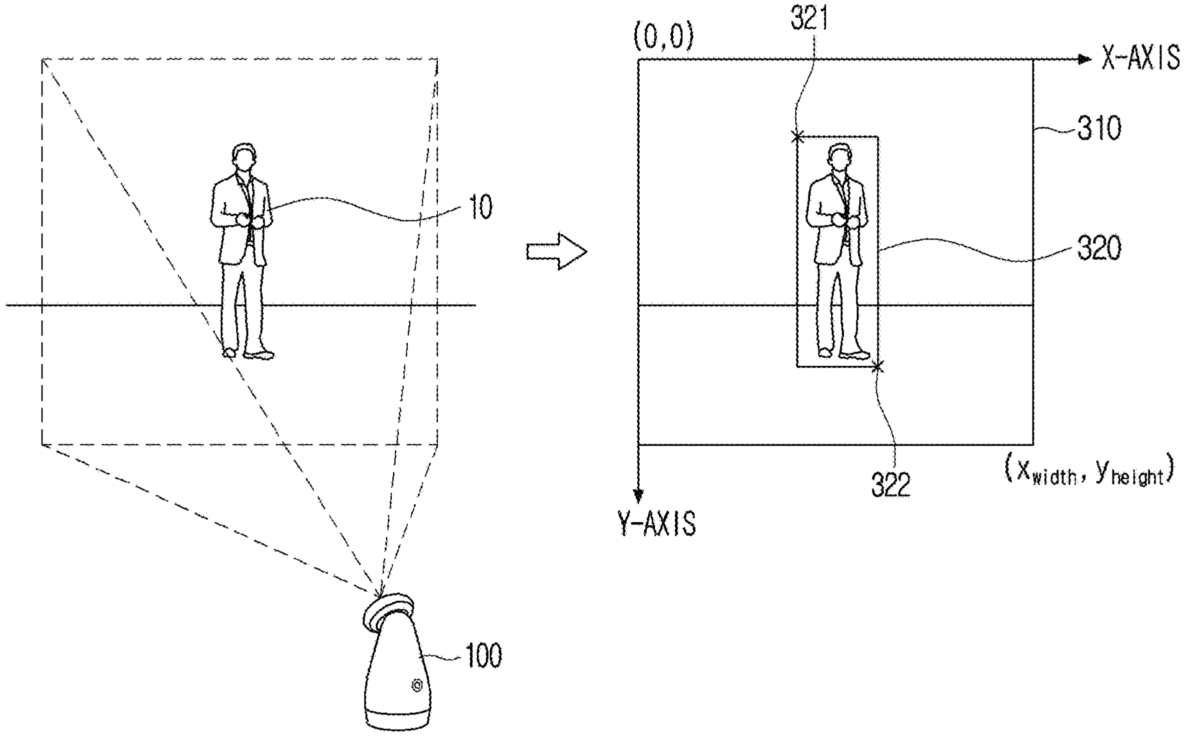
FIG. 3 is a diagram illustrating an example of a bounding box for a user detected from an image according to one or more embodiments.

The bounding box for the user may mean a box of a quadrangle form which includes the user detected from the image. For example, as in FIG. 3, the processor 143 may obtain an image 310 included with a user 10 using the sensor 120. At this time, assuming that coordinates of an upper left pixel of the image 310 is (0, 0), a position of a bounding box 320 may be represented by x,y coordinate values of a pixel 321 corresponding to a left upper end vertex of the bounding box 320 and x,y coordinate values of a pixel 322 corresponding to a right lower end vertex of the bounding box 320.

Further, the processor 143 may identify a pixel distance between a center pixel of the image and a pixel of the bounding box.

The center pixel of the image may include a pixel positioned at the center of the image. For example, it may be assumed that the coordinates of the pixel at a left upper end of the image 310 obtained by the sensor 120 is (0,0), and the coordinates of the pixel at a right lower end of the image is ($x_{width}$, $y_{height}$). The $x_{width}$, $y_{height}$ may be determined based on a resolution of the image 310 obtained by the sensor 120. At this time, the coordinates of the center pixel of the image may be ($x_{width}/2$, $y_{height}/2$).

The pixel distance may include a Euclidean Distance between two pixels. For example, a pixel distance between a pixel with coordinates of ($x_1$, $y_1$) and a pixel with coordinates of ($x_2$, $y_2$) may be presented as $$\sqrt{(x_1 - x_2)^2 + (y_1 - y_2)^2}.$$

At this time, the processor 143 may identify a pixel corresponding to each of the four sides of the bounding box, and identify each of the pixel distance between the center pixel of the image and the identified pixel.

For example, the processor 143 may identify a pixel corresponding to a left side of the bounding box. The left side of the bounding box may be a line that connects a pixel corresponding to the left upper end vertex of the bounding box and a pixel corresponding to a left lower end vertex of the bounding box.

The processor 143 may identify a pixel with an x coordinate value that is same as an x coordinate value of a pixel corresponding to the left upper end vertex of the bounding box, and a y coordinate value that is same as a y coordinate value of the center pixel of the image from among the plurality of pixels in the image as a pixel corresponding to the left side of the bounding box. Further, the processor 143 may identify a pixel distance between the pixel corresponding to the left side of the bounding box and the center coordinates of the image.

For example, the if the coordinates of the pixel corresponding to the left upper end vertex of the bounding box is ($x_{upper\_left}$, $y_{upper\_left}$), and the coordinates of the center pixel of the image is ($x_c$, $y_c$), the processor 143 may identify the pixel with coordinates of ($x_{upper\_left}$, $y_c$) from among the plurality of pixels in the image as the pixel corresponding to the left side of the bounding box. Further, the processor 143 may identify a pixel distance between ($x_{upper\_left}$, $y_c$) and ($x_c$, $y_c$).

In addition, the processor 143 may identify a pixel corresponding to a right side of the bounding box. The right side of the bounding box may be a line that connects a pixel corresponding to a right upper end vertex of the bounding box and a pixel corresponding to the right lower end vertex of the bounding box.

The processor 143 may identify an x coordinate value from among the plurality of pixels in the image as same as an x coordinate value of a pixel corresponding to a right lower end vertex of the bounding box, and a pixel with a y coordinate value that is same as the y coordinate value of the center pixel of the image as a pixel as corresponding to the right side of the bounding box. Further, the processor 143 may identify a pixel distance between a pixel corresponding to the right side of the bounding box and center coordinates of the image.

For example, if the coordinates of the pixel corresponding to the right lower end vertex of the bounding box is ($x_{lower\_right}$, $y_{lower\_right}$), and the coordinates of the center pixel of the image is ($x_c$, $y_c$), the processor 143 may identify the pixel with coordinates of ($x_{lower\_right}$, $y_c$) from among the plurality of pixels in the image as the pixel corresponding to the right side of the bounding box. Further, the processor 143 may identify the pixel distance between ($x_{lower\_right}$, $y_c$) and ($x_c$, $y_c$).

In addition, the processor 143 may identify a pixel corresponding to an upper side of the bounding box. The upper side of the bounding box may be a line that connects the pixel corresponding to the left upper end vertex of the bounding box and a pixel corresponding to the right upper end vertex of the bounding box.

The processor 143 may identify the x coordinate value from among the plurality of pixels in the image as same as an x coordinate value of the center pixel of the image, and a pixel with a y coordinate value that is same as a y coordinate value of the pixel corresponding to the left upper end vertex of the bounding box as a pixel as corresponding to the upper side of the bounding box. Further, the processor 143 may identify a pixel distance between the pixel corresponding to the right side of the bounding box and the center coordinates of the image.

For example, if the coordinates of the pixel corresponding to the left upper end vertex of the bounding box is ($x_{upper\_left}$, $y_{upper\_left}$), and the coordinates of the center pixel of the image is ($x_c$, $y_c$), the processor 143 may identify the pixel with coordinates of ($x_c$, $y_{upper\_left}$) from among the plurality of pixels in the image as a pixel corresponding to the upper side of the bounding box. Further, the processor 143 may identify a pixel distance between ($x_c$, $y_{upper\_left}$) and ($x_c$, $y_c$).

In addition, the processor 143 may identify a pixel corresponding to a lower side of the bounding box. The lower side of the bounding box may be a line that connects the pixel corresponding to the left lower end vertex of the bounding box with the pixel corresponding to the right lower end vertex of the bounding box.

The processor 143 may identify the x coordinate value from among the plurality of pixels in the image as same as the x coordinate value of the center pixel of the image, and a pixel with a y coordinate value that is same as a y coordinate value of the pixel corresponding to the right lower end vertex of the bounding box as a pixel as corresponding to the lower side of the bounding box. Further, the processor 143 may identify a pixel distance between a pixel corresponding to the lower side of the bounding box and the center coordinates of the image.

For example, if the coordinates of the pixel corresponding to the right lower end vertex of the bounding box is ($x_{lower\_right}$, $y_{lower\_right}$), and the coordinates of the center pixel of the image is ($x_c$, $y_c$), the processor 143 may identify a pixel with coordinates of ($x_c$, $y_{lower\_right}$) from among the plurality of pixels in the image as the pixel corresponding to the lower side of the bounding box. Further, the processor 143 may identify a pixel distance between ($x_c$, $y_{lower\_right}$) and ($x_c$, $y_c$).

Further, the processor 143 may identify a rotation angle of the sensor 120 based on the identified pixel distance and a focal distance of the sensor 120.

The focal distance may include a distance from a principal point of the lens to an image sensor.

The rotation angle of the sensor 120 may include a horizontal rotation angle range and a vertical rotation angle range.

For example, the processor 143 may identify the horizontal rotation angle range based on a first pixel distance, a second pixel distance, and a focal distance.

At this time, the first pixel distance may be the pixel distance between the pixel corresponding to the left side of the bounding box and the center coordinates of the image, and the second pixel distance may be the pixel distance between the pixel corresponding to the right side of the bounding box and the center coordinates of the image.

Further, the horizontal rotation angle range may include an angle range between a maximum rotation angle of the sensor 120 toward a right direction and the maximum rotation angle of the sensor 120 toward a left direction. For example, the horizontal rotation angle range may include an angle range between the maximum rotation angle of the sensor 120 toward the right direction and the maximum rotation angle of the sensor 120 toward the left direction based on a capturing angle of the sensor 120 which captured an image obtained by the bounding box.

At this time, the maximum rotation angle of the sensor 120 toward the right direction may include the rotation angle of the sensor 120 which positions, based on obtaining an image by rotating the sensor 120 toward the right direction, the left side of the bounding box for the user at a left edge of the obtained image. In addition, the maximum rotation angle of the sensor 120 toward the left direction may be a rotation angle of the sensor 120 which positions, based on obtaining an image by rotating the sensor 120 toward the left direction, the right side of the bounding box for the user at a right edge of the obtained image.

For example, the processor 143 may identify, based on an x coordinate value of the pixel corresponding to the left side of the bounding box being greater than the x coordinate value of the center pixel of the image, the maximum rotation angle of the sensor 120 toward the right direction as (horizontal FOV of sensor)/2+$\tan^{-1}$(first pixel distance/focal distance). In addition, the processor 143 may identify, based on the x coordinate value of the pixel corresponding to the left side of the bounding box being less than the x coordinate value of the center pixel of the image, the maximum rotation angle of the sensor 120 toward the right direction as (horizontal FOV of sensor)/2−$\tan^{-1}$(first pixel distance/focal distance). In addition, the processor 143 may identify, based on the x coordinate value of the pixel corresponding to the left side of the bounding box being same as the x coordinate value of the center pixel of the image, the maximum rotation angle of the sensor 120 toward the right direction as (horizontal FOV of sensor)/2.

Further, the processor 143 may identify, based on the x coordinate value of the pixel corresponding to the right side of the bounding box being greater than the x coordinate value of the center pixel of the image, the maximum rotation angle of the sensor 120 toward the left direction as (horizontal FOV of sensor)/2−$\tan^{-1}$(second pixel distance/focal distance). In addition, the processor 143 may identify, based on the x coordinate value of the pixel corresponding to the right side of the bounding box being less than the x coordinate value of the center pixel of the image, the maximum rotation angle of the sensor 120 toward the left direction as (horizontal FOV of sensor)/2+$\tan^{-1}$(second pixel distance/focal distance). In addition, the processor 143 may identify, based on the x coordinate value of the pixel corresponding to the right side of the bounding box being same as the x coordinate value of the center pixel of the image, the maximum rotation angle of the sensor 120 toward the left direction as (horizontal FOV of sensor)/2.

For example, the processor 143 may identify the vertical rotation angle range based on a third pixel distance, a fourth pixel distance, and the focal distance.

At this time, the third pixel distance may be a pixel distance between the pixel corresponding to the upper side of the bounding box and the center coordinates of the image, and the fourth pixel distance may be a pixel distance between the pixel corresponding to the lower side of the bounding box and the center coordinates of the image.

Further, the vertical rotation angle range may include an angle range between the maximum rotation angle of the sensor 120 toward a lower direction and the maximum rotation angle of the sensor 120 toward an upper direction. For example, the vertical rotation angle range may include the angle range between the maximum rotation angle of the sensor 120 toward the lower direction and the maximum rotation angle of the sensor 120 toward the upper direction based on the capturing angle of the sensor 120 which captured the image obtained by the bounding box.

At this time, the maximum rotation angle of the sensor 120 toward the lower direction may include the rotation angle of the sensor 120 which positions, based on obtaining an image by rotating the sensor 120 toward the lower direction, the upper side of the bounding box for the user at an upper edge of the obtained image. In addition, the maximum rotation angle of the sensor 120 toward the upper direction may include a rotation angle of the sensor 120 which positions, based on obtaining an image by rotating the sensor 120 toward the upper direction, the lower side of the bounding box for the user at a lower edge of the obtained image.

For example, the processor 143 may identify, based on a y coordinate value of the pixel corresponding to the upper side of the bounding box being less than the y coordinate value of the center pixel of the image, the maximum rotation angle of the sensor 120 toward the lower direction as (vertical FOV of sensor)/2−$\tan^{-1}$(third pixel distance/focal distance). In addition, the processor 143 may identify, based on the y coordinate value of the pixel corresponding to the upper side of the bounding box being greater than the y coordinate value of the center pixel of the image, the maximum rotation angle of the sensor 120 toward the lower direction as (vertical FOV of sensor)/2+$\tan^{-1}$(third pixel distance/focal distance). In addition, the processor 143 may identify, based on the y coordinate value of the pixel corresponding to the upper side of the bounding box being same as the y coordinate value of the center pixel of the image, the maximum rotation angle of the sensor 120 toward the lower direction as (vertical FOV of sensor)/2.

Further, the processor 143 may identify, based on the y coordinate value of the pixel corresponding to the lower side of the bounding box being less than the y coordinate value of the center pixel of the image, the maximum rotation angle of the sensor 120 toward the upper direction as (vertical FOV of sensor)/2+$\tan^{-1}$(fourth pixel distance/focal distance). In addition, the processor 143 may identify, based on the y coordinate value of the pixel corresponding to the lower side of the bounding box being greater than the y coordinate value of the center pixel of the image, the maximum rotation angle of the sensor 120 toward the upper direction as (vertical FOV of sensor)/2−$\tan^{-1}$(fourth pixel distance/focal distance). In addition, the processor 143 may identify, based on the y coordinate value of the pixel corresponding to the lower side of the bounding box being same as the y coordinate value of the center pixel of the image, the maximum rotation angle of the sensor 120 toward the upper direction as (vertical FOV of sensor)/2.

Further, the processor 143 may rotate the sensor 120 within the rotation angle range.

At this time, the rotation of the sensor 120 may include the sensor 120 being rotated and the sensor 120 being rotated according to one portion of the robot 100 in which the sensor 120 is disposed rotating.

For example, if the sensor 120 is disposed in the body of the robot 100, the processor 143 may rotate the body of the robot 100 within the rotation angle range by controlling the driving part 130. At this time, the sensor 120 may be rotated together with the body within the rotation angle range. In addition, if the robot 100 is configured with the first portion (e.g., the body) and the second portion (e.g., the head, the arm, etc.), and the sensor 120 is disposed at the second portion, the processor 143 may rotate the second portion of the robot 100 within the rotation angle range by controlling the driving part 130. At this time, the sensor 120 may be rotated together with the second portion within the rotation angle range.

For example, the processor 143 may rotate the sensor 120 toward the right direction and the left direction within the horizontal rotation angle range, and rotate the sensor 120 toward the lower direction and the upper direction within the vertical rotation angle range.

Further, the processor 143 may obtain information by using the sensor 120 while the sensor 120 is rotating. At this time, the information may include an image and depth information.

Figure 4:
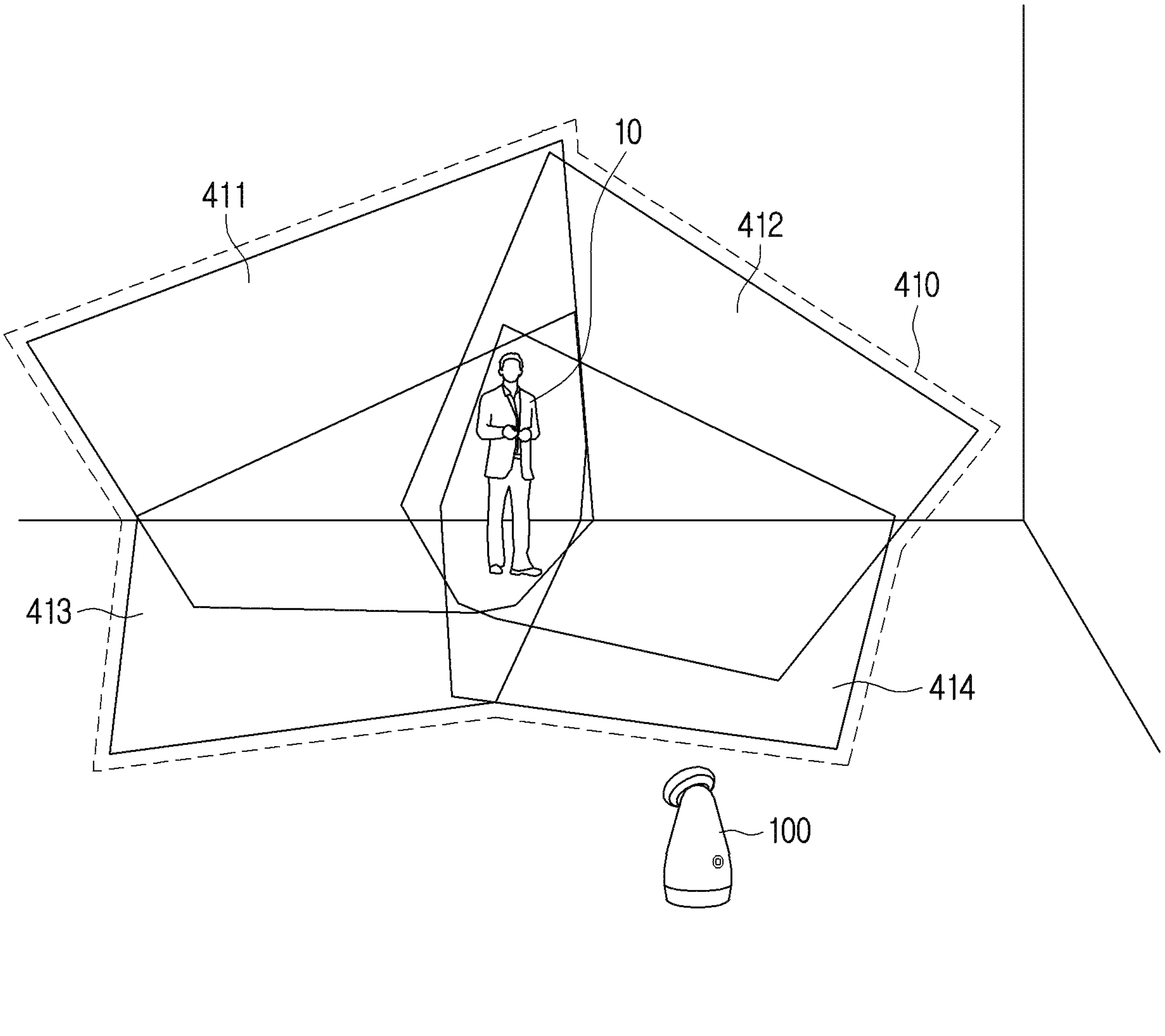
FIG. 4 is a diagram illustrating an example of a method in which a robot is configured to sense a surrounding area of a user according to one or more embodiments.

For example, referring to FIG. 4, the sensor 120 may sense a surrounding area 410 of the user 10 while the sensor 120 is rotating.

At this time, an area 411 may be an area which is sensed by the sensor 120 rotated based on the maximum rotation direction toward the left direction and the maximum rotation direction toward the upper direction. In addition an area 412 may be an area sensed by the sensor 120 rotated based on the maximum rotation angle toward the right direction and the maximum rotation direction toward the upper direction. In addition, an area 413 may be an area sensed by the sensor 120 rotated based on the maximum rotation angle toward the left direction and the maximum rotation direction toward the lower direction. In addition, an area 414 may be an area sensed by the sensor 120 rotated based on the maximum rotation angle toward the right direction and the maximum rotation direction toward the lower direction.

The processor 143 may generate a 3-dimensional map of the user surroundings based on information obtained by sensing the user surroundings using the sensor 120 (S220).

For example, the processor 143 may obtain a 3-dimensional map configured with a point cloud based on an image and depth information obtained by using the sensor 120. According to one or more embodiments, the processor 143 may obtain a 3-dimensional map using a 3D reconstruction. The point cloud may include a set of points from a 3-dimensional space. Each point from the point cloud may include x,y,z coordinate values of a point and an RGB value.

The processor 143 may identify a plane from an area of the user surroundings based on the 3-dimensional map (S230).

At this time, the processor 143 may identify a plane from the user surroundings using a RANdom SAmple Consensus (RANSAC).

For example, the processor 143 may randomly select three points from among the points included in an area of the 3-dimensional map. Further, the processor 143 may identify a plane defined by the selected points. The plane may be represented by an equation of the plane such as $ax+by+cz+d=0$. Further, the processor 143 may identify a distance between the remaining points excluding the three points from among the points included in the area and the plane, and identify an inlier based on the identified distance. The inlier may include a point of which a distance from the plane is less than or equal to a threshold value from among the points included in the area.

The processor 143 may perform the above-described process a plurality of times, and identify a plurality of planes and a number of inliers of each of the plurality of planes. Further, the processor 143 may identify a plane with the most number of inliers from among the plurality of planes based on the number of inliers of the plurality of planes.

Further, the processor 143 may identify, based on a number of points included in the area and a number of inliers of the identified plane (e.g., the plane with the most number of inliers), a ratio of inliers of the identified plane for points included in the area. At this time, the processor 143 may identify, based on the identified ratio being greater than or equal to the threshold value, the area as the plane, and identify, based on the identified ratio being less than the threshold value, the area as not the plane.

Through the process described above, the processor 143 may identify an area which is the plane from the 3-dimensional map of the user surroundings.

The processor 143 may identify a plurality of areas with an aspect ratio that is the same as an aspect ratio of the projection image on the identified plane (S240).

At this time, the aspect ratio of the projection image (or projection picture) may include an aspect ratio of an image to be projected from the projector 110. For example, the aspect ratio may include various ratios such as 4:3, 5:4, or 16:9.

For example, the processor 143 may identify points included in the plane based on the 3-dimensional map, and randomly select a point from among the points included in the plane. Further, the processor 143 may generate a candidate area on the plane by extending an area from the selected point such that the selected point becomes the center. At this time, the area may be extended within the same plane, and an aspect ratio of the extending area may be the same as the aspect ratio of the projection image. The processor 143 may generate a plurality of candidate areas on the plane by performing the above-described process a plurality of times. The candidate area may mean a candidate area at which projection of an image is possible based on the candidate area being a quadrangle area with the same aspect ratio of the projection image on the plane.

Further, the processor 143 may identify a plurality of areas from among the plurality of candidate areas based on a position and size of the plurality of candidate areas.

For example, the processor 143 may determine, based on a size of the plurality of candidate areas, a plurality of areas by selecting areas in plurality in an order of the size being the largest from among the plurality of candidate areas. At this time, the number of areas selected may be pre-set.

At this time, the processor 143 may not select a candidate area included within another candidate area on the plane based on a position of the plurality of candidate areas. One are being included in another area may include a whole one area being positioned within the another area. Accordingly, if at least one portion of the one area is positioned outside of the another area, the one area may not be considered as included in the another area.

The processor 143 may identify a plurality of candidate projection areas from among the plurality of areas (S250).

For example, the processor 143 may identify a plurality of candidate projection areas from among the plurality of areas based on the characteristics of the plurality of areas. At this time, a characteristic of an area may include a saturation of the area. The processor 143 may identify, based on an area in which saturation is greater than or equal to a threshold value from among the plurality of areas being identified based on the RGB value of points included in the plurality of areas, the remaining area excluding the identified area from among the plurality of areas as the plurality of candidate projection areas.

For example, the processor 143 may obtain the RGB value of points included in the plurality of areas based on the 3-dimensional map, and identify the saturation of the plurality of areas based on the RGB value. For example, the processor 143 may identify the saturation of each point based on the RGB value of points included in each area, and identify the saturation of each area by calculating an average value of the identified saturation. At this time, the processor 143 may identify saturation of an area using the RGB value of all points included in the area, or select a sample point from among all points included in the area and identify saturation of an area using an RGB value of the selected sample point.

Further, the processor 143 may identify whether there is an area in which saturation is greater than or equal to the threshold value from among the plurality of areas by comparing the saturation of each of the plurality of areas with the threshold value. Further, the processor 143 may determine, based on the area in which saturation is greater than or equal to the threshold value being identified from among the plurality of areas, the remaining area excluding the identified area from among the plurality of areas as the plurality of candidate projection areas.

Based on saturation indicating darkness and lightness of color, an area with high saturation may indicate that a color of an area being dark. If an image is projected at an area with dark color, in light of the projected image not being easily visible to the user, the area with high saturation may be excluded from the candidate projection area.

Figure 5A:
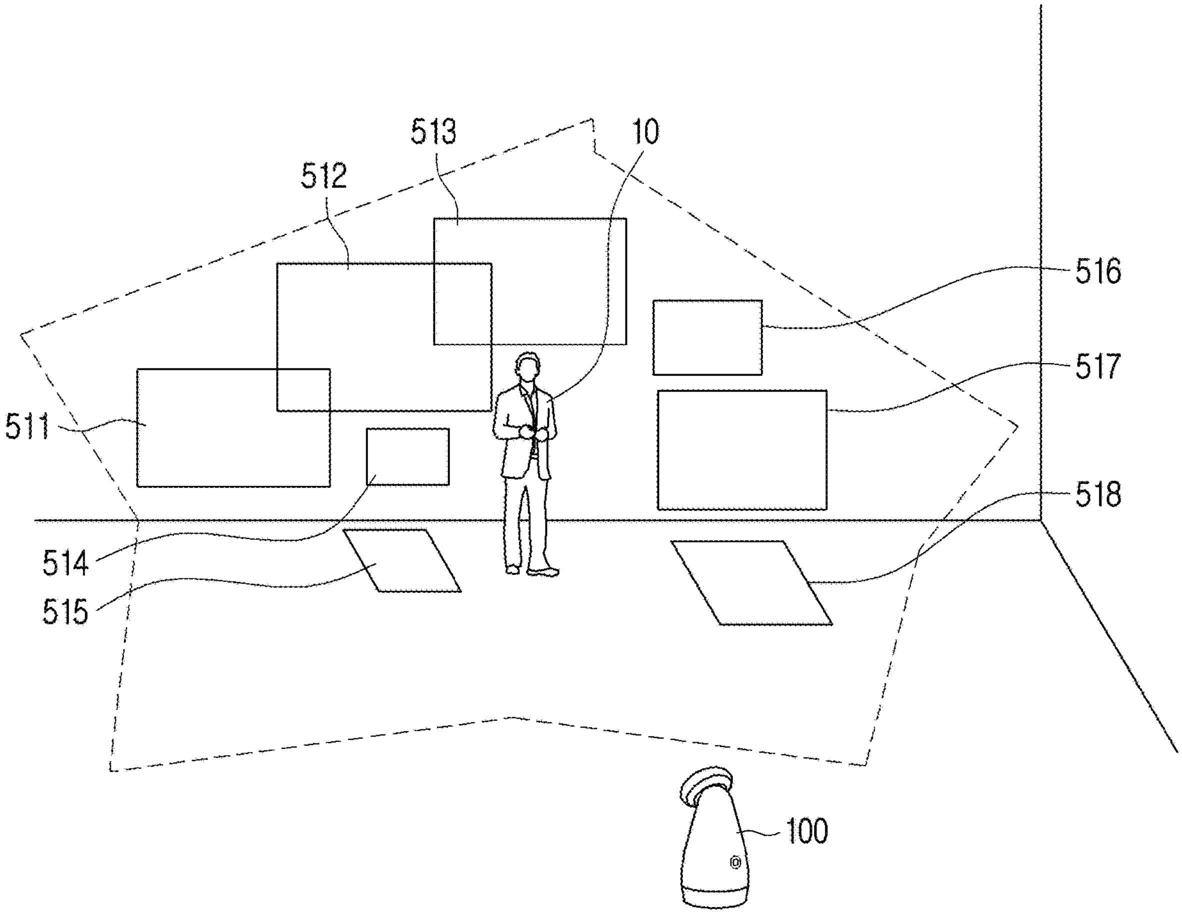
FIG. 5A and FIG. 5B are diagrams illustrating an example of an operation in which a robot is configured to identify a plurality of candidate projection areas according to one or more embodiments.

For example, referring to FIG. 5A, the processor 143 may identify a plurality of areas 511, 512, 513, 514, 515, 516, 517, and 518 from the surroundings of the user 10. At this time, each of the plurality of areas may be positioned on the plane, and an aspect ratio of each area may be the same as an aspect ratio of the projection image. Further, referring to FIG. 5B, the processor 143 may identify a plurality of candidate projection areas 512, 513, 515, and 517 from among the plurality of areas 511, 512, 513, 514, 515, 516, 517, and 518. At this time, saturation of the candidate projection area may be less than the threshold value.

The processor 143 may identify a priority order of the plurality of candidate projection areas (S260).

The priority order may be information which designates an order to which the projection area may be set from among the plurality of candidate projection areas. For example, the priority order may include, when an image is projected at the candidate projection areas, an order of the candidate projection areas by which the projected image is visible to the user.

For example, the processor 143 may identify the priority order of the plurality of candidate projection areas based on the characteristics of the plurality of candidate projection areas. At this time, a characteristic of a candidate projection area may include a size of the candidate projection area and a distance between the user and the candidate projection area.

The processor 143 may identify a size of each of the plurality of candidate projection areas.

As described above, the candidate projection area may be generated by being extended from a point on the plane, and the point may be the center of the candidate projection area. The processor 143 may identify the size of the candidate projection area based on a degree to which the candidate projection area is extended from the point.

In addition, the processor 143 may identify a distance between the user and each of the plurality of candidate projection areas.

For example, the processor 143 may identify x,y,z coordinate values which correspond to a position of the user on a 3-dimensional map. As described above, the processor 143 may generate the 3-dimensional map of the user surroundings using an image and depth information. The processor 143, may obtain, in a process of generating the 3-dimensional map, the x,y,z coordinate values on the 3-dimensional map corresponding to x,y coordinate values of the user, and identify the x,y,z coordinate values corresponding to the position of the user on the 3-dimensional map. At this time, the x,y coordinate values of the user may include coordinate values corresponding to the position of the user obtained from the image. For example, the x,y coordinate values of the user obtained from the image may be x,y coordinate values of the center pixel of the bounding box for the user. If coordinates of a pixel corresponding to the left upper end vertex of the bounding box is $(x_{upper\_left}, y_{upper\_left})$, and coordinates of a pixel corresponding to the right lower end vertex of the bounding box is $(x_{lower\_right}, y_{lower\_right})$, coordinates of the center pixel of the bounding box may be represented as $((x_{lower\_right}-x_{upper\_left})/2, (y_{lower\_right}-y_{upper\_left})/2)$.

Further, the processor 143 may identify the distance between the user and the candidate projection area by using the x,y,z coordinate values of the point corresponding to the center of the candidate projection area and the x,y,z coordinate values corresponding to the position of the user. At this time, the distance may include a Euclidean distance between two coordinate values.

The processor 143 may identify the priority order of the plurality of candidate projection areas based on a size of each of the plurality of candidate areas and a distance between the user and each of the plurality of candidate projection areas.

For example, the processor 143 may identify a score of a candidate projection area based on the distance between the user and the candidate projection area and the size of the candidate projection area. At this time, the score may be calculated based on Equation 1 below.

$$\text{score} = w_1 \times \frac{1}{D} + w_2 \times S \quad \text{[Equation 1]}$$

Here, D represents a distance between the user and the candidate projection area, S represents the size of the candidate projection area, and w1 and w2 represent weight values.

Further, the processor 143 may identify, based on a score of the plurality of candidate projection areas, the priority order of the plurality of candidate projection areas in an order for a candidate projection area with a high score to have a high priority order. Accordingly, a candidate projection area which is close to the user and has a bigger size may have a relatively high priority order from among the plurality of candidate projection areas.

The processor 143 may display information on the priority order of the plurality of candidate projection areas at the plurality of candidate projection areas (S270).

For example, the processor 143 may control the projector 110 to project an image at an area that includes the plurality of candidate projection areas based on the position of the plurality of candidate projection areas and the priority order of the plurality of candidate projection areas such that the information on the priority order of the plurality of candidate projection areas is simultaneously or consecutively displayed on the plurality of candidate projection areas.

To this end, the processor 143 may identify whether the plurality of candidate projection areas is present within an area at which an image is to be projected by the projector 110.

For example, the processor 143 may obtain 3-dimensional coordinate values of points corresponding to vertices of each of the plurality of candidate projection areas based on the 3-dimensional map. At this time, the 3-dimensional coordinate values may be coordinate values on a world coordinate system.

Further, the processor 143 may convert the 3-dimensional coordinate values to 2-dimensional coordinate values. At this time, the 2-dimensional coordinate values may be coordinate values on a pixel coordinate system for an image to be projected by the projector 110. For example, the processor 143 may convert the 3-dimensional coordinate values to the 2-dimensional coordinate values using a camera calibration as in Equation 2 below.

$$s\begin{bmatrix} x \\ y \\ z \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \end{bmatrix} \begin{bmatrix} X \\ Y \\ Z \\ 1 \end{bmatrix} = K[R|t] \begin{bmatrix} X \\ Y \\ Z \\ 1 \end{bmatrix} \quad \text{[Equation 2]}$$

Here, X,Y,Z may represent the 3-dimensional coordinate values, and x,y may represent the 2-dimensional coordinate values. Further, K may represent an Intrinsic Matrix, [R|t] may represent an Extrinsic Matrix, and s may represent a scale factor.

The Intrinsic Matrix may include an internal parameter of the camera (e.g. sensor 120) such as a focal distance (e.g., fx, fy) of the camera and a principal point (e.g., cx, cy) of the camera.

The Extrinsic Matrix may be a matrix for converting the world coordinate system to a camera coordinate system, and may include an external parameter of the camera such as a rotation and translation of the camera. At this time, the rotation and translation of the camera may indicate a pose of the camera. For example, the processor 143 may obtain a parameter on the rotation and translation of the camera using Visual Odometry for estimating the pose of the camera.

Further, the processor 143 may identify whether the 2-dimensional coordinate values corresponding to the candidate projection area is present within a pixel range of an image to be projected by the projector 110. At this time, the 2-dimensional coordinate values corresponding to the candidate projection area may include 2-dimensional coordinate values in which the 3-dimensional coordinate values of the candidate projection area are converted.

For example, it may be assumed that coordinates of a pixel of a left upper end of an image to be projected by the projector 110 is (0,0), and coordinates of a pixel at a right lower end of the image is $(x_{width}, y_{height})$. Here, $x_{width}$, $y_{height}$ may be determined based on a resolution of the image to be projected by the projector 110. In this case, the pixel range of the image may be $0 \le x \le x_{width}$, $0 \le y \le y_{height}$. At this time, $0 \le x \le x_{width}$ may be a pixel range of an x coordinate value, and $0 \le y \le y_{height}$ may be a pixel range of a y coordinate value.

The processor 143 may identify, based on an x coordinate value being present within a pixel range of the x coordinate value and a y coordinate value being present within a pixel range of the y coordinate value from among the 2-dimensional coordinate values corresponding to the candidate projection area, that the candidate projection area is present within an area at which the image is to be projected by the projector 110. Further, the processor 143 may identify, based on the x coordinate value not being present within the pixel range of the x coordinate value and the y coordinate value not being present within the pixel range of the y coordinate value from among the 2-dimensional coordinate values corresponding to the candidate projection area, that the candidate projection area is not present within the area at which the image is to be projected by the projector 110.

Through the method described above, the processor 143 may identify whether the plurality of candidate projection areas is present within the area at which the image is to be projected by the projector 110.

The processor 143 may identify, based on a candidate projection area from among the plurality of candidate projection areas being identified as not present within the area at which the image is to be projected by the projector 110, a rotation angle of the projector 110 for the candidate projection area to be positioned within an area at which the image is to be projected by the projector 110, and rotate the projector 110 based on the identified rotation angle. The plurality of candidate projection areas by the rotation of the projector 110 may be positioned within the area at which the image is to be projected by the projector 110.

For example, the processor 143 may identify the rotation angle of the projector 110 based on the x,y coordinate values of the candidate projection area identified as not being present within the area at which the image is to be projected.

At this time, the rotation angle of the projector 110 may include the horizontal rotation angle and the vertical rotation angle.

According to one or more embodiments, the processor 143 may identify coordinate values present outside of the pixel range of the image from among the x,y coordinate values of the candidate projection area. For example, the processor 143 may identify an x coordinate value present outside of the pixel range of the x coordinate value of the image from among the x coordinate values of the candidate projection area, and identify a y coordinate value present outside of the pixel range of the y coordinate value of the image from among the y coordinate values of the candidate projection area.

Further, the processor 143 may identify, based on at least one x coordinate value present outside of the pixel range of the x coordinate value of the image being identified, each of the identified x coordinate values and a distance between a lower limit (e.g., 0) or an upper limit (e.g., $x_{width}$) of the pixel range of the x coordinate value. At this time, the processor 143 may identify a value closest in distance with the x coordinate value from among the lower limit and the upper limit and a distance between the x coordinate values.

In addition, the processor 143 may identify, based on at least one y coordinate value present outside of the pixel range of the y coordinate value of the image being identified, each of the identified y coordinate values and a distance between a lower limit (e.g., 0) or an upper limit (e.g., $y_{height}$) of the pixel range of the y coordinate value. At this time, the processor 143 may identify a value closest in distance with the y coordinate value from among the lower limit and the upper limit and a distance between the y coordinate values.

FIG. 6A, FIG. 6B, FIG. 6C, and FIG. 6D are diagrams illustrating an example of a plurality of areas 620, 630, 640, and 650 defined by the 2-dimensional coordinate values corresponding to the plurality of candidate projection areas on the pixel coordinate system for an image 610 to be projected by the projector 110.

Figure 5B:
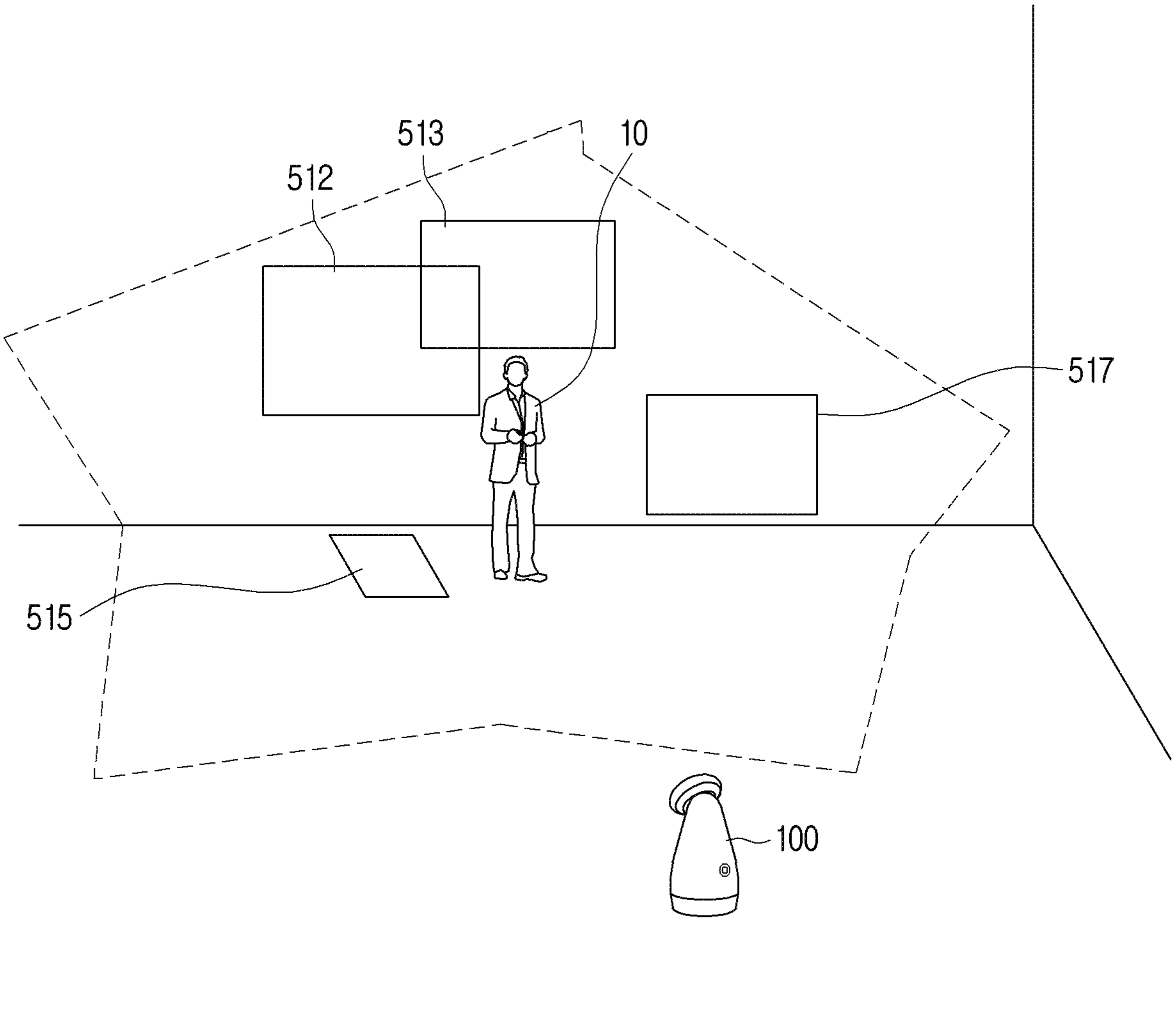

For example, an area 620 may be an area defined by 2-dimensional coordinate values corresponding to a first candidate projection area (e.g., 512 in FIG. 5B). An area 630 may be an area defined by 2-dimensional coordinate values corresponding to a second candidate projection area (e.g., 513 in FIG. 5B). An area 640 may be an area defined by 2-dimensional coordinate values corresponding to a third candidate projection area (e.g., 515 in FIG. 5B). An area 650 may be an area defined by 2-dimensional coordinate values corresponding to a fourth candidate projection area (e.g., 517 in FIG. 5B).

Figure 6A:
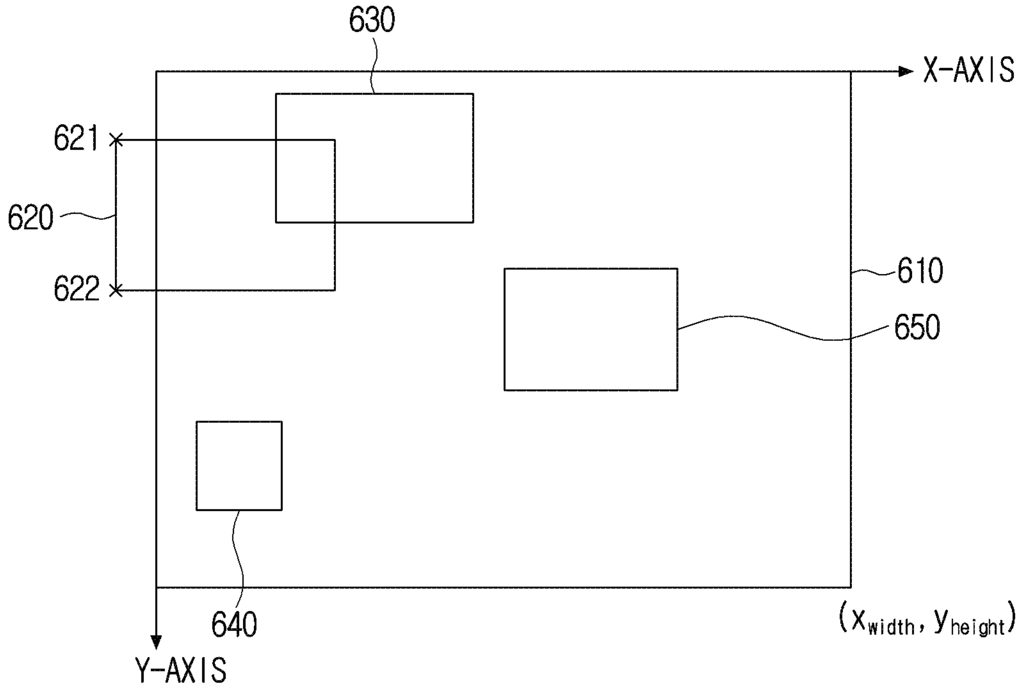
FIG. 6A, FIG. 6B, FIG. 6C, and FIG. 6D are diagrams illustrating an example of a method in which a robot is configured to position a candidate projection area within a pixel range of an image according to one or more embodiments.

Referring to FIG. 6A, the processor 143 may identify that an x coordinate value of a pixel 621 corresponding to a left upper end vertex of the area 620 and an x coordinate value of a pixel 622 corresponding to a left lower end vertex of the area 620 have exceeded the pixel range of the x coordinate value of the image 610. At this time, the processor 143 may identify a distance between the x coordinate value of the pixel 621 and the lower limit of the pixel range of the x coordinate value of the image 610, and identify a distance between the x coordinate value of the pixel 622 and the lower limit of the pixel range of the x coordinate value of the image 610.

Further, the processor 143 may identify the rotation angle of the projector 110 based on a distance with a large size from among the identified distances. At this time, the rotation angle of the projector 110 may include a rotation angle toward the left direction. For example, information on the rotation angle of the projector 110, which allows for the x coordinate value to be positioned within the pixel range of the x coordinate value of the image, may be stored in the memory 142 according to a distance between the x coordinate value and the pixel range of the x coordinate value. The processor 143 may identify the rotation angle of the projector 110 based on information on the rotation angle of the projector 110 according to the identified distance.

Figure 6B:
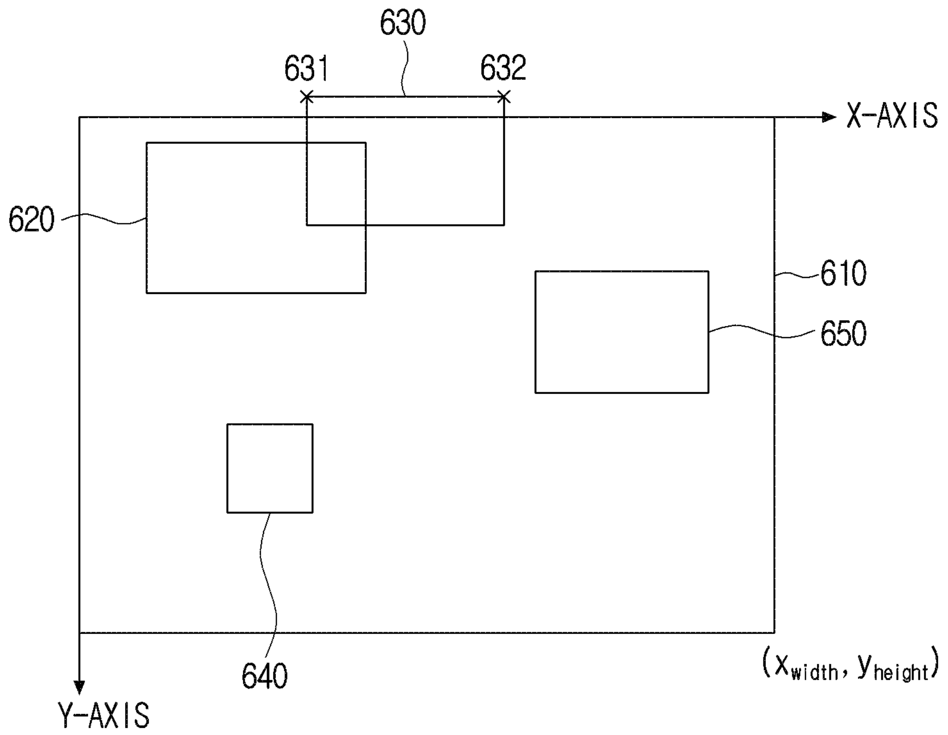

In addition, referring to FIG. 6B, the processor 143 may identify that a y coordinate value of a pixel 631 corresponding to a left upper end vertex of the area 630 and a y coordinate value of a pixel 632 corresponding to a right upper end vertex of the area 630 have exceeded the pixel range of the y coordinate value of the image 610. At this time, the processor 143 may identify a distance between the y coordinate value of the pixel 631 and the lower limit of the pixel range of the y coordinate value of the image 610, and identify a distance between the y coordinate value of the pixel 632 and the lower limit of the pixel range of the y coordinate value of the image 610.

Further, the processor 143 may identify the rotation angle of the projector 110 based on a distance with a large size from among the identified distances. At this time, the rotation angle of the projector 110 may include a rotation angle toward the upper direction. For example, information on the rotation angle of the projector 110, which allows for the y coordinate value to be positioned within the pixel range of the y coordinate value of the image, may be stored in the memory 142 according to a distance between the y coordinate value and the pixel range of the y coordinate value. The processor 143 may identify the rotation angle of the projector 110 based on information on the rotation angle of the projector 110 according to the identified distance.

Figure 6C:
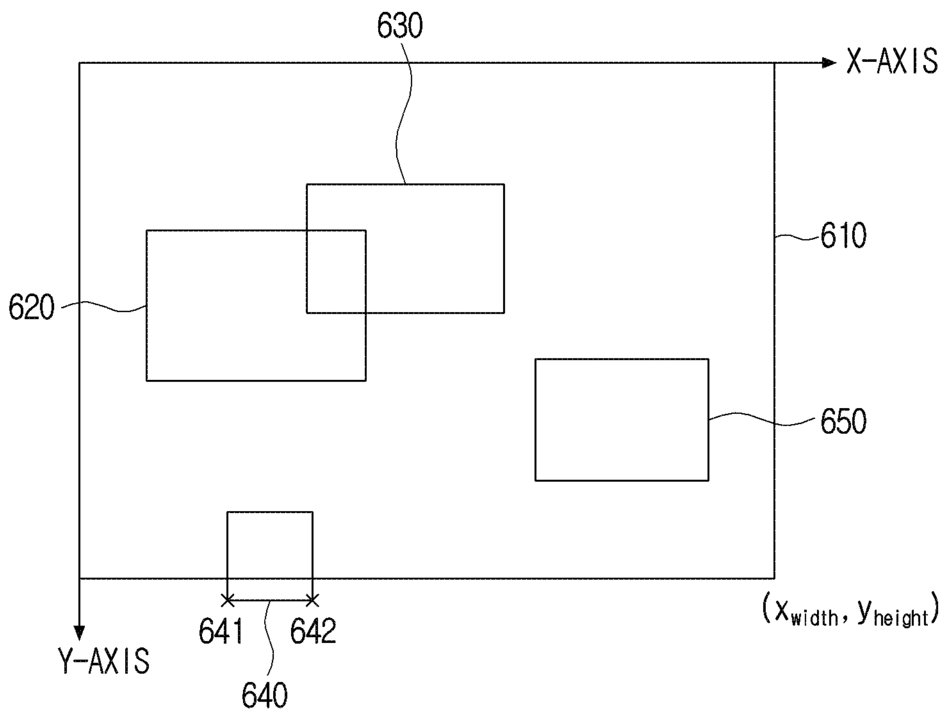

In addition, referring to FIG. 6C, the processor 143 may identify that a y coordinate value of a pixel 641 corresponding to a left lower end vertex of the area 640 and a y coordinate value of a pixel 642 corresponding to a right lower end vertex of the area 640 have exceeded the pixel range of the y coordinate value of the image 610. At this time, the processor 143 may identify a distance between the y coordinate value of the pixel 641 and the upper limit of the pixel range of the y coordinate value of the image 610, and identify a distance between the y coordinate value of the pixel 642 and the upper limit of the pixel range of the y coordinate value of the image 610.

Further, the processor 143 may identify the rotation angle of the projector 110 based on a distance with a large size from among the identified distances. At this time, the rotation angle of the projector 110 may include a rotation angle toward the lower direction. For example, information on the rotation angle of the projector 110, which allows for the y coordinate value to be positioned within the pixel range of the y coordinate value of the image, may be stored in the memory 142 according to a distance between the y coordinate value and the pixel range of the y coordinate value. The processor 143 may identify the rotation angle of the projector 110 based on information on the rotation angle of the projector 110 according to the identified distance.

Figure 6D:
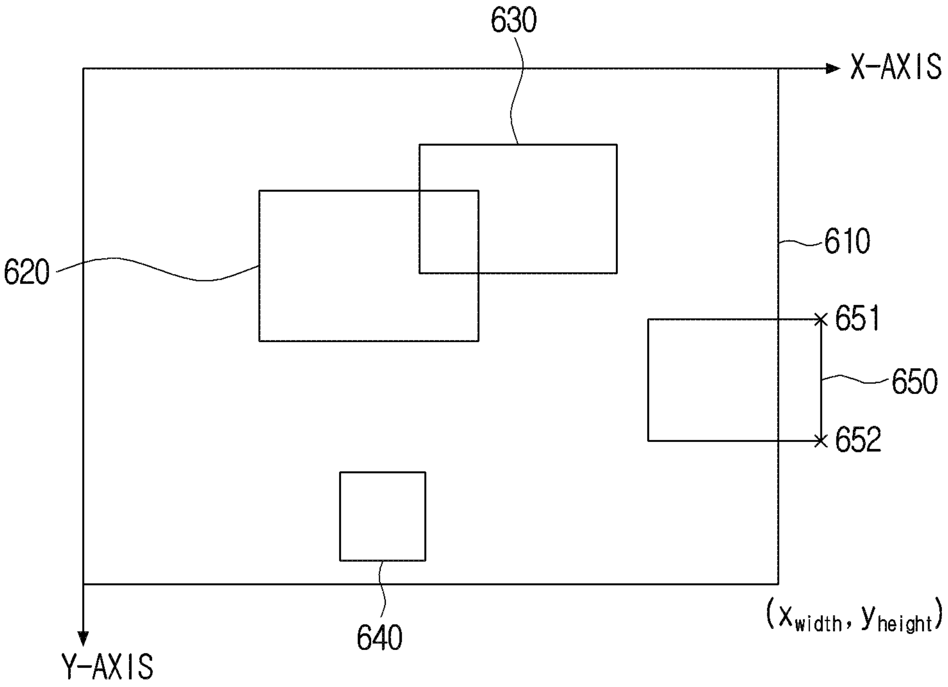

In addition, referring to FIG. 6D, the processor 143 may identify that an x coordinate value of a pixel 651 corresponding to a right upper end vertex of the area 650 and an x coordinate value of a pixel 652 corresponding to a right lower end vertex of the area 650 have exceeded the pixel range of the x coordinate value of the image 610. At this time, the processor 143 may identify a distance between the x coordinate value of the pixel 651 and the upper limit of the pixel range of the x coordinate value of the image 610, and identify a distance between the x coordinate value of the pixel 652 and the upper limit of the pixel range of the x coordinate value of the image 610.

Further, the processor 143 may identify the rotation angle of the projector 110 based on a distance with a large size from among the identified distances. At this time, the rotation angle of the projector 110 may include a rotation angle toward the right direction. For example, information on the rotation angle of the projector 110, which allows for the x coordinate value to be positioned within the pixel range of the x coordinate value of the image, may be stored in the memory 142 according to a distance between the x coordinate value and the pixel range of the x coordinate value. The processor 143 may identify the rotation angle of the projector 110 based on information on the rotation angle of the projector 110 according to the identified distance.

As described above, the processor 143 may identify the rotation angles in the left direction, the right direction, the upper direction, or the lower direction of the projector 110 for the at least one candidate projection area positioned outside of the pixel range of the image to be positioned within the pixel range of the image. At this time, the processor 143 may identify the rotation angle of the projector 110 for an area present within the pixel range of the image to not be moved outside of the pixel range of the image according to the rotation of the projector 110. Further, the processor 143 may rotate the projector 110 based on the identified rotation angle.

Further, the processor 143 may generate an image to be projected by the projector 110 based on a plurality of sub images.

According to one or more embodiments, the processor 143 may match the plurality of sub images to the plurality of areas of the image which is to be projected by the projector 110, and generate an image in which the plurality of sub images are included in the plurality of areas.

For example, the processor 143 may identify, based on a position of the plurality of candidate projection areas, a plurality of areas corresponding to the plurality of candidate projection areas from an image to be projected in the area that includes the plurality of candidate projection areas. At this time, an area corresponding to the candidate projection area may include an area defined by 2-dimensional coordinate values corresponding to the candidate projection area on the image to be projected.

Further, the processor 143 may obtain the plurality of sub images corresponding to the plurality of areas.

A color of the plurality of sub images may be different from a color of the remaining area of the image to be projected by the projector 110. For example, the color of the plurality of sub images may be a first color, and the color of the remaining area may be a second color different from the first color.

Each of the plurality of sub images may include indicators corresponding to the priority order of each of the plurality of candidate projection areas. The indicator may include a number or a character indicating the priority order of the candidate projection areas. The character may include a character that marks a number with a language or a character having an order (e.g., alphabet, etc.). The indicator may include various graphic elements that can visually provide the user with information on the priority order of the candidate projection areas using numbers or characters, and may be substituted with expressions such as the GUI or icons. A color of the indicator may be different from a color of a background area. At this time, the background area may include a remaining area excluding the indicator from a sub image.

Further, the processor 143 may match the plurality of sub images to the plurality of areas. At this time, the processor 143 may obtain a plurality of transform matrices to match the plurality of sub images to the plurality of areas. The transform matrix may include a Homography Matrix.

For example, the processor 143 may obtain a transform matrix for matching a sub image to an area corresponding to the sub image based on Equation 3 below.

$$\begin{bmatrix} x' \\ y' \\ 1 \end{bmatrix} = \alpha \begin{bmatrix} h_1 & h_2 & h_3 \\ h_4 & h_5 & h_6 \\ h_7 & h_8 & h_9 \end{bmatrix} \begin{bmatrix} x \\ y \\ 1 \end{bmatrix} = H \begin{bmatrix} x \\ y \\ 1 \end{bmatrix} \quad \text{[Equation 3]}$$

Here, H represents Homography Matrix, (x, y) represents coordinates of pixels corresponding to vertices of the sub image, and (x', y') represent coordinates of an area corresponding to the sub image from the image to be projected by the projector 110.

Further, the processor 143 may generate an image in which the plurality of sub images is included in the plurality of areas by applying the plurality of transform matrices to the plurality of sub images.

Figure 7:
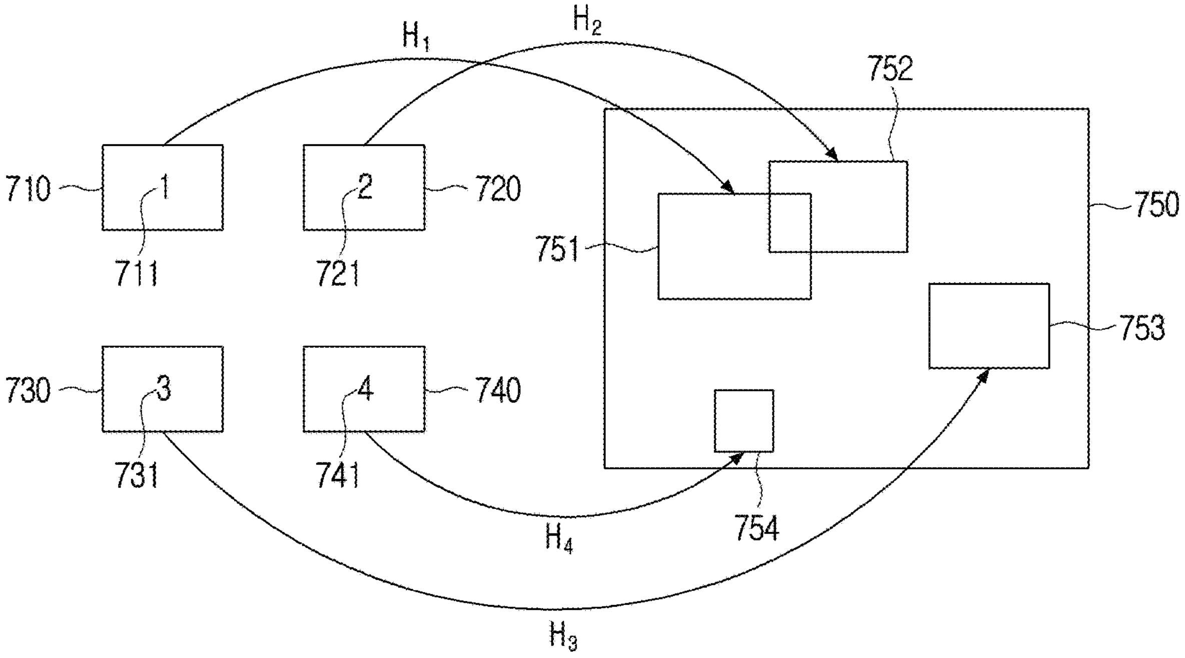
FIG. 7 is a diagram illustrating an example of a method in which a robot is configured to generate an image to be projected using a projector according to one or more embodiments.

For example, referring to FIG. 7, the processor 143 may apply a transform matrix $H_1$ to RGB values of pixels of a first sub image 710 corresponding to the first candidate projection area, and match the first sub image 710 to an area 751 corresponding to the first candidate projection area in an image 750 to be projected by the projector 110. The first candidate projection area may be a candidate projection area with a first priority order, and the first sub image 710 may include number 1 711 indicating the priority order of the first candidate projection area.

In addition, the processor 143 may apply a transform matrix $H_2$ to RGB values of pixels of a second sub image 720 corresponding to the second candidate projection area, and match the second sub image 720 to an area 752 corresponding to the second candidate projection area in the image 750 to be projected by the projector 110. The second candidate projection area may be a candidate projection area with a second priority order, and the second sub image 720 may include number 2 721 indicating the priority order of the second candidate projection area.

In addition, the processor 143 may apply a transform matrix $H_3$ to RGB values of pixels of a third sub image 730 corresponding to the third candidate projection area, and match the third sub image 730 to an area 753 corresponding to the third candidate projection area in the image 750 to be projected by the projector 110. The third candidate projection area may be a candidate projection area with a third priority order, and the third sub image 730 may include number 3 731 indicating the priority order of the third candidate projection area.

In addition, the processor 143 may apply a transform matrix $H_4$ to RGB values of pixels of a fourth sub image 740 corresponding to the fourth candidate projection area, and match the fourth sub image 740 to an area 754 corresponding to the fourth candidate projection area in the image 750 to be projected by the projector 110. The fourth candidate projection area may be a candidate projection area with a fourth priority order, and the fourth sub image 740 may include number 4 741 indicating the priority order of the fourth candidate projection area.

Further, the processor 143 may control the projector 110 to project an image in which the plurality of sub images are included in the plurality of areas. At this time, when the image is projected, the plurality of sub images included in the plurality of the areas of the image may be respectively projected at the plurality of candidate projection areas.

Figure 8:
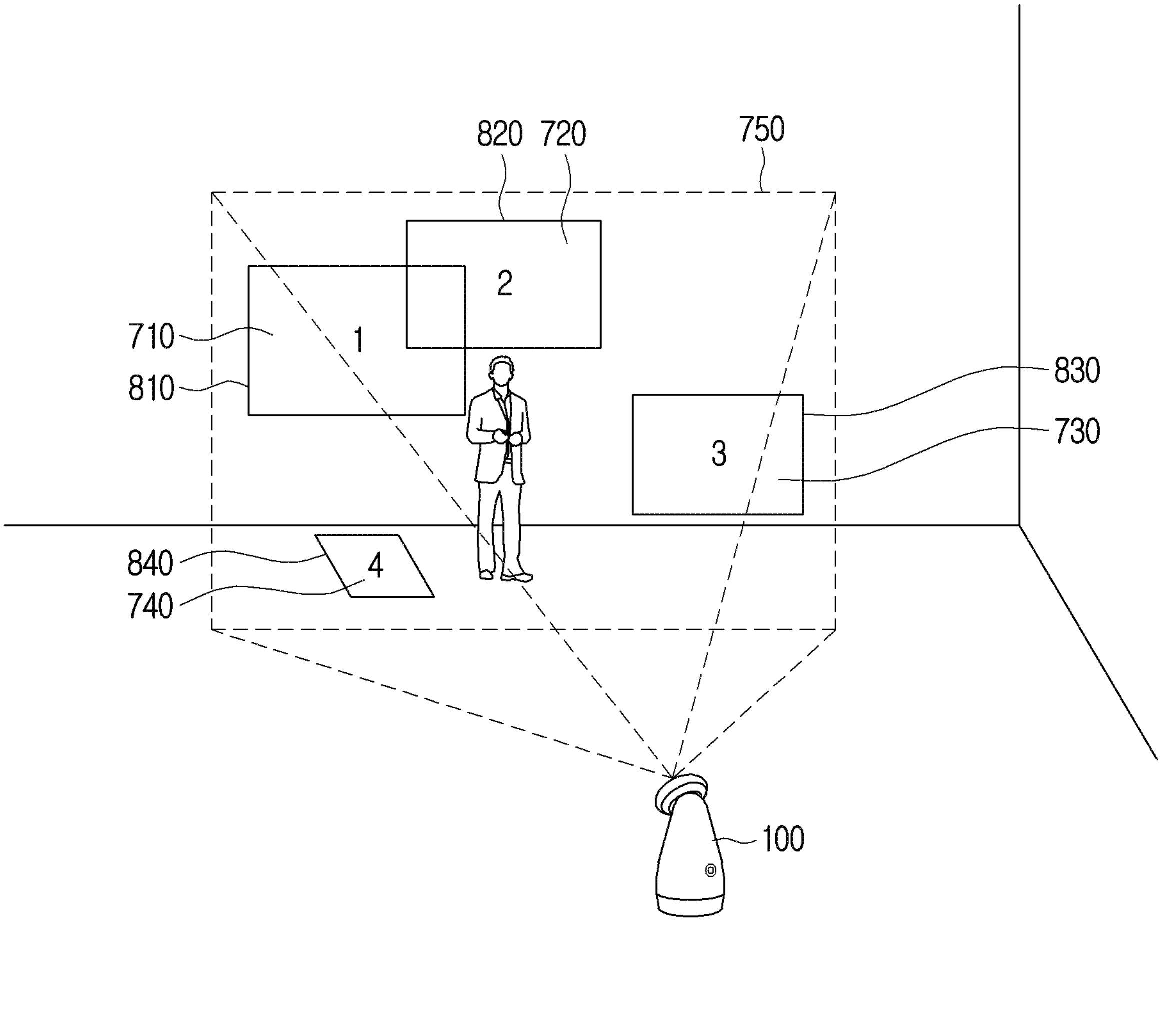
FIG. 8 is a diagram illustrating an example of an operation in which a robot is configured to project an image according to one or more embodiments.

For example, referring to FIG. 8, the processor 143 may control the projector 110 to project the image 750 including the first to fourth sub images 710, 720, 730, and 740.

At this time, when the image 750 is projected, the first sub image 710 may be positioned at a first candidate projection area 810, the second sub image 720 may be positioned at a second candidate projection area 820, the third sub image 730 may be positioned at a third candidate projection area 830, and the fourth sub image 740 may be positioned at a fourth candidate projection area 840.

According to one or more embodiments, the processor 143 may match the sub image corresponding to an area at which an image is to be projected by the projector 110, and generate a plurality of images included with sub images for each area.

For example, the processor 143 may identify an area corresponding to the candidate projection area from the image to be projected at an area based on the position of the candidate projection area for each of the candidate projection areas. At this time, the area corresponding to the candidate projection area may include an area defined by the 2-dimensional coordinate values corresponding to the candidate projection area on the image to be projected.

Further, the processor 143 may obtain a plurality of sub images corresponding to the plurality of areas.

The color of the plurality of sub images may be different from the color of the remaining area of the image to be projected by the projector 110. For example, the color of the plurality of sub images may be the first color, and the color of the remaining area may be the second color different from the first color.

Each of the plurality of sub images may include the indicators corresponding to the priority order of each of the plurality of candidate projection areas. The indicator may include the number or character indicating the priority order of the candidate projection areas. The character may include characters that mark a number with a language or a character having an order (e.g., alphabet, etc.). The indicator may include various graphic elements that can visually provide the user with information on the priority order of the candidate projection areas using numbers or characters, and may be substituted with expressions such as the GUI or icons. The color of the indicator may be different from the color of the background area. At this time, the background area may include the remaining area excluding the indicator from the sub image.

Further, the processor 143 may match the sub image to an area. At this time, the processor 143 may obtain a transform matrix for matching the sub image corresponding to the area to an area. Further, the processor 143 may generate an image in which the sub image is included in the area by applying the transform matrix to the sub image.

Figure 9:
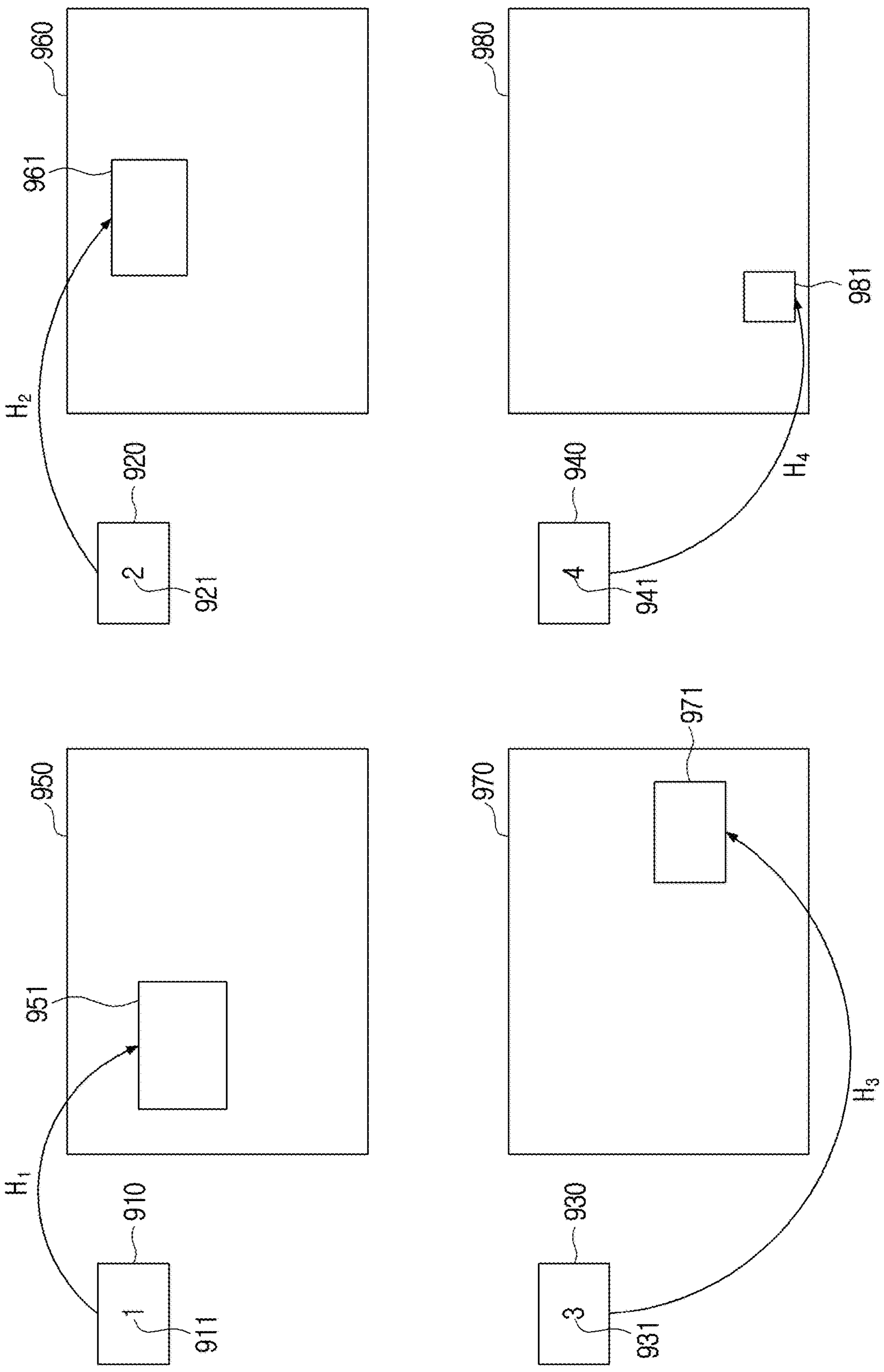
FIG. 9 is a diagram illustrating an example of a method in which a robot is configured to generate a plurality of images to be projected using a projector according to one or more embodiments.

For example, referring to FIG. 9, the processor 143 may apply the transform matrix $H_1$ to RGB values of pixels of a first sub image 910 corresponding to the first candidate projection area, and match the first sub image 910 to an area 951 corresponding to the first candidate projection area in an image 950 to be projected by the projector 110. The first candidate projection area may be a candidate projection area with a first priority order, and the first sub image 910 may include number 1 911 indicating the priority order of the first candidate projection area.

In addition, the processor 143 may apply the transform matrix $H_2$ to RGB values of pixels of a second sub image 920 corresponding to the second candidate projection area, and match the second sub image 920 to an area 961 corresponding to the second candidate projection area in an image 960 to be projected by the projector 110. The second candidate projection area may be a candidate projection area with a second priority order, and the second sub image 920 may include number 2 921 indicating the priority order of the second candidate projection area.

In addition, the processor 143 may apply the transform matrix $H_3$ to RGB values of pixels of a third sub image 930 corresponding to the third candidate projection area, and match the third sub image 930 to an area 971 corresponding to the third candidate projection area in an image 970 to be projected by the projector 110. The third candidate projection area may be a candidate projection area with a third priority order, and the third sub image 930 may include number 3 931 indicating the priority order of the third candidate projection area.

In addition, the processor 143 may apply the transform matrix $H_4$ to RGB values of pixels of a fourth sub image 940 corresponding to the fourth candidate projection area, and match the fourth sub image 940 to an area 981 corresponding to the fourth candidate projection area in an image 980 to be projected by the projector 110. The fourth candidate projection area may be a candidate projection area with a fourth priority order, and the fourth sub image 940 may include number 4 941 indicating the priority order of the fourth candidate projection area.

Further, the processor 143 may control the projector 110 to consecutively project the plurality of images in which each sub image is included in each area. At this time, when the image is projected, the sub image included in the area of the image may be projected at each of the candidate projection areas. The processor 143 may control, based on the priority order of the plurality of candidate projection areas, the projector 110 to project from an image which includes a sub image corresponding to a candidate projection area with a high priority order.

Figure 10A:
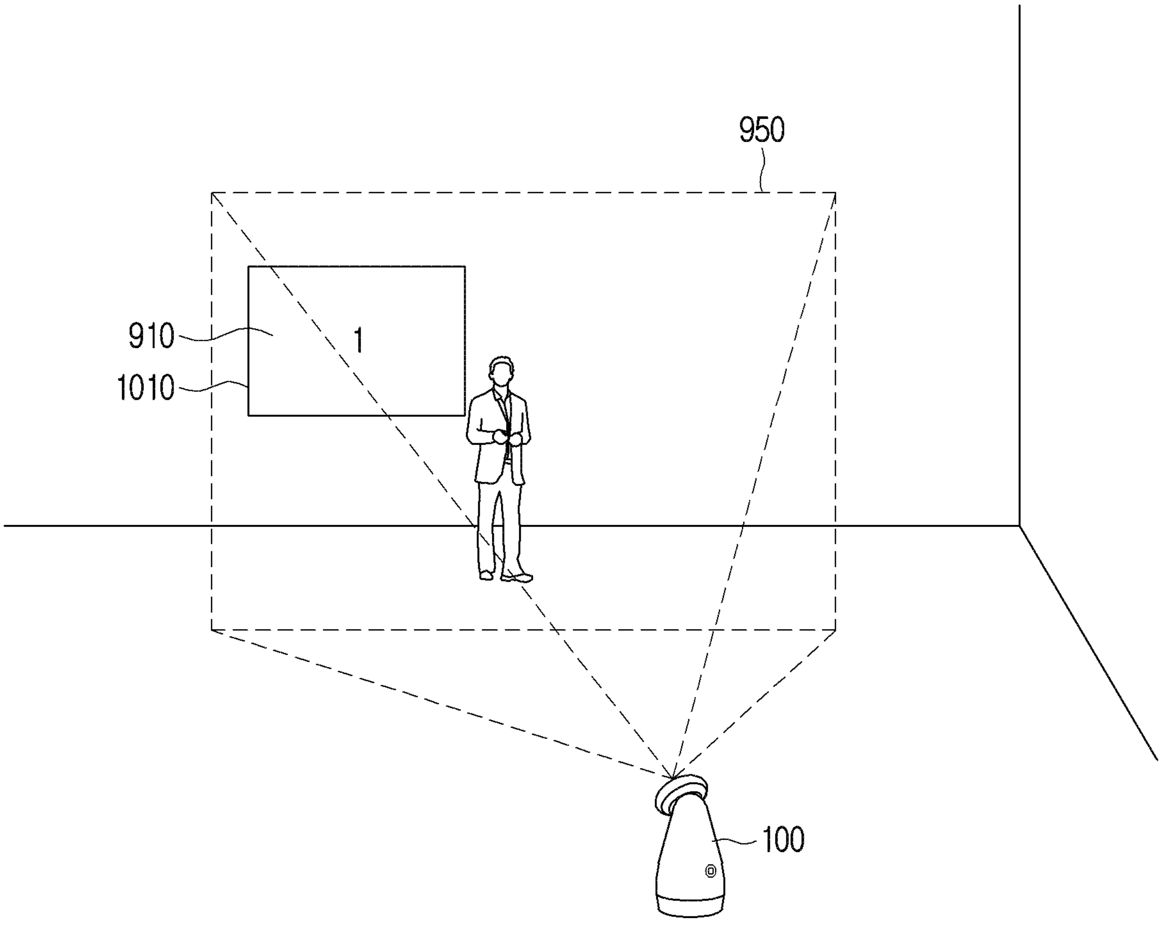
FIG. 10A, FIG. 10B, FIG. 10C, and FIG. 10D are diagrams illustrating an example of an operation in which a robot is configured to project a plurality of images according to one or more embodiments.

For example, referring to FIG. 10A, the processor 143 may control the projector 110 to project the image 950 including the first sub image 910. At this time, when the image 950 is projected, the first sub image 910 may be positioned at a first candidate projection area 1010.

Figure 10B:
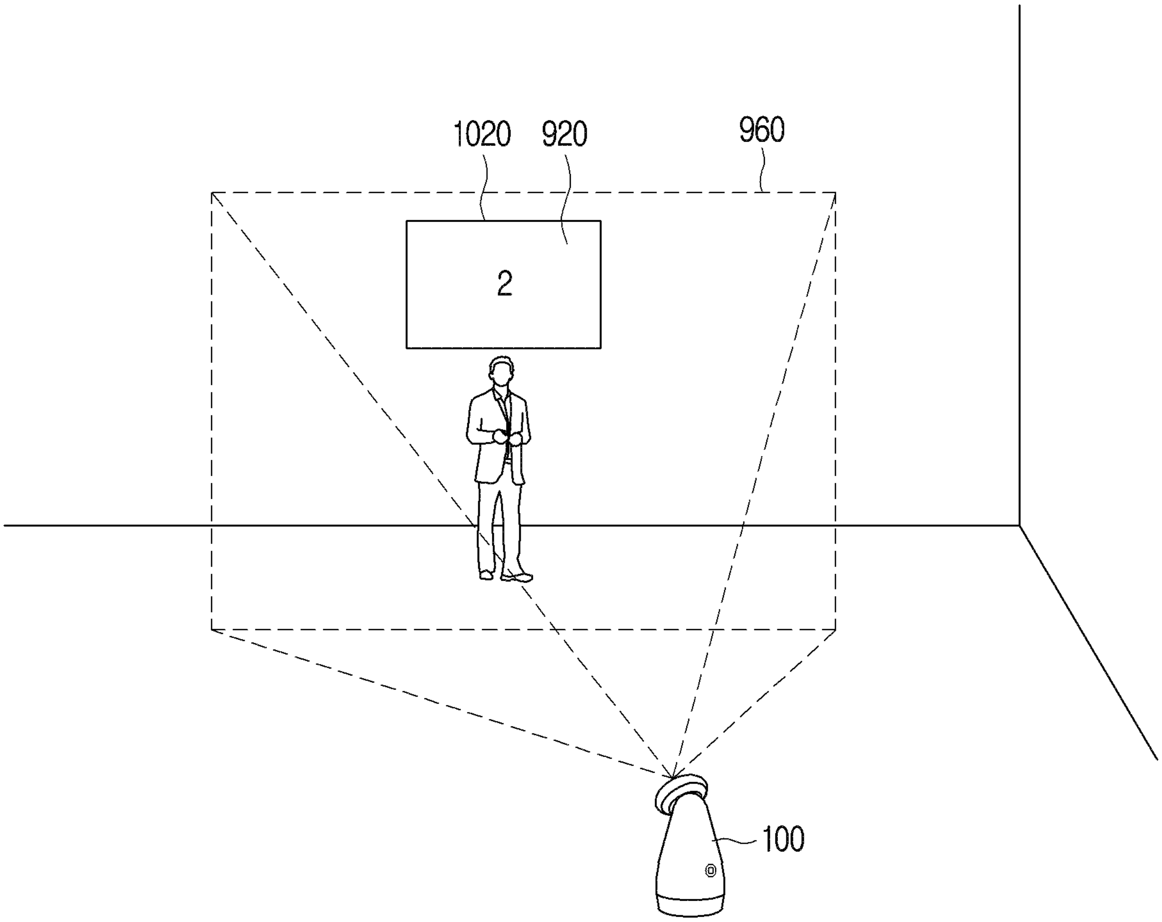

Referring to FIG. 10B, the processor 143 may control the projector 110 to project the image 960 including the second sub image 920. At this time, when the image 960 is projected, the second sub image 920 may be positioned at a second candidate projection area 1020.

Figure 10C:
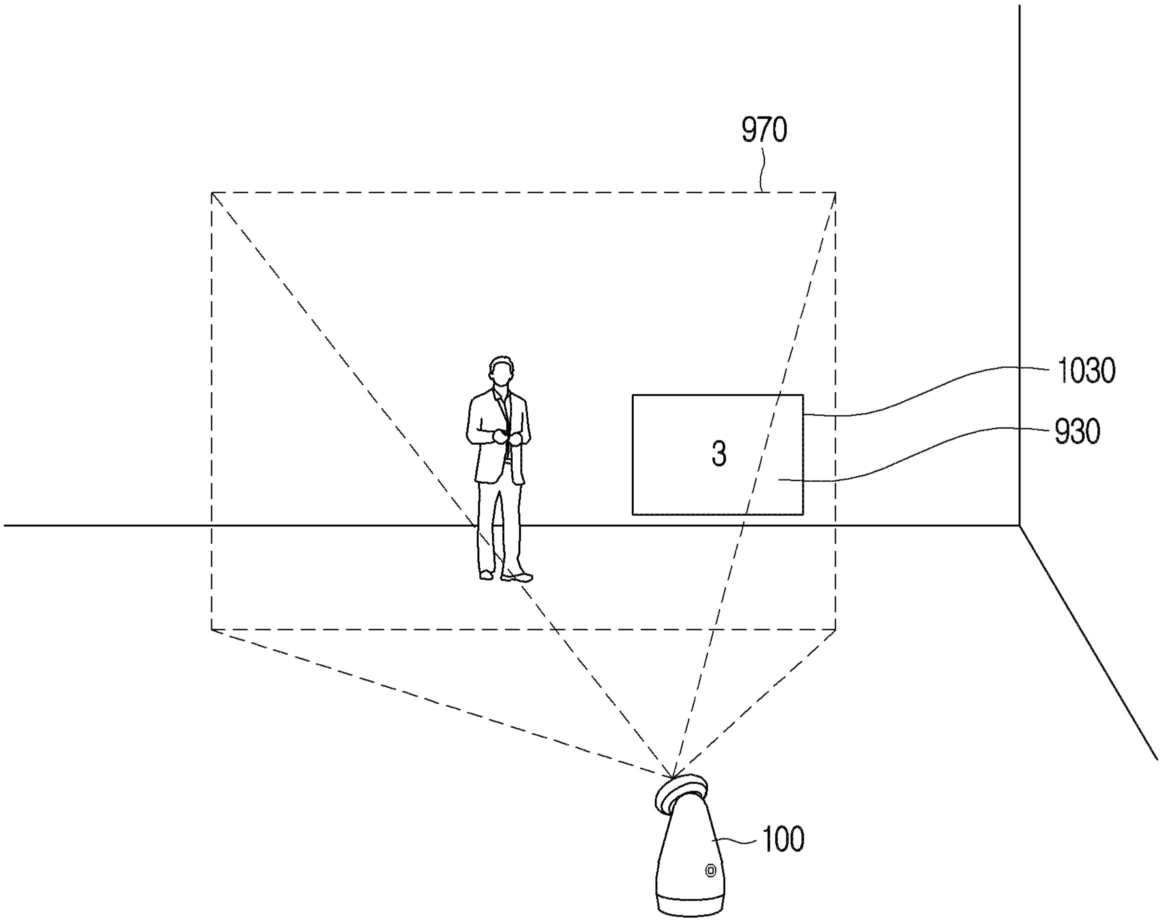

Referring to FIG. 10C, the processor 143 may control the projector 110 to project the image 970 including the third sub image 930. At this time, when the image 970 is projected, the third sub image 930 may be positioned at a third candidate projection area 1030.

Figure 10D:
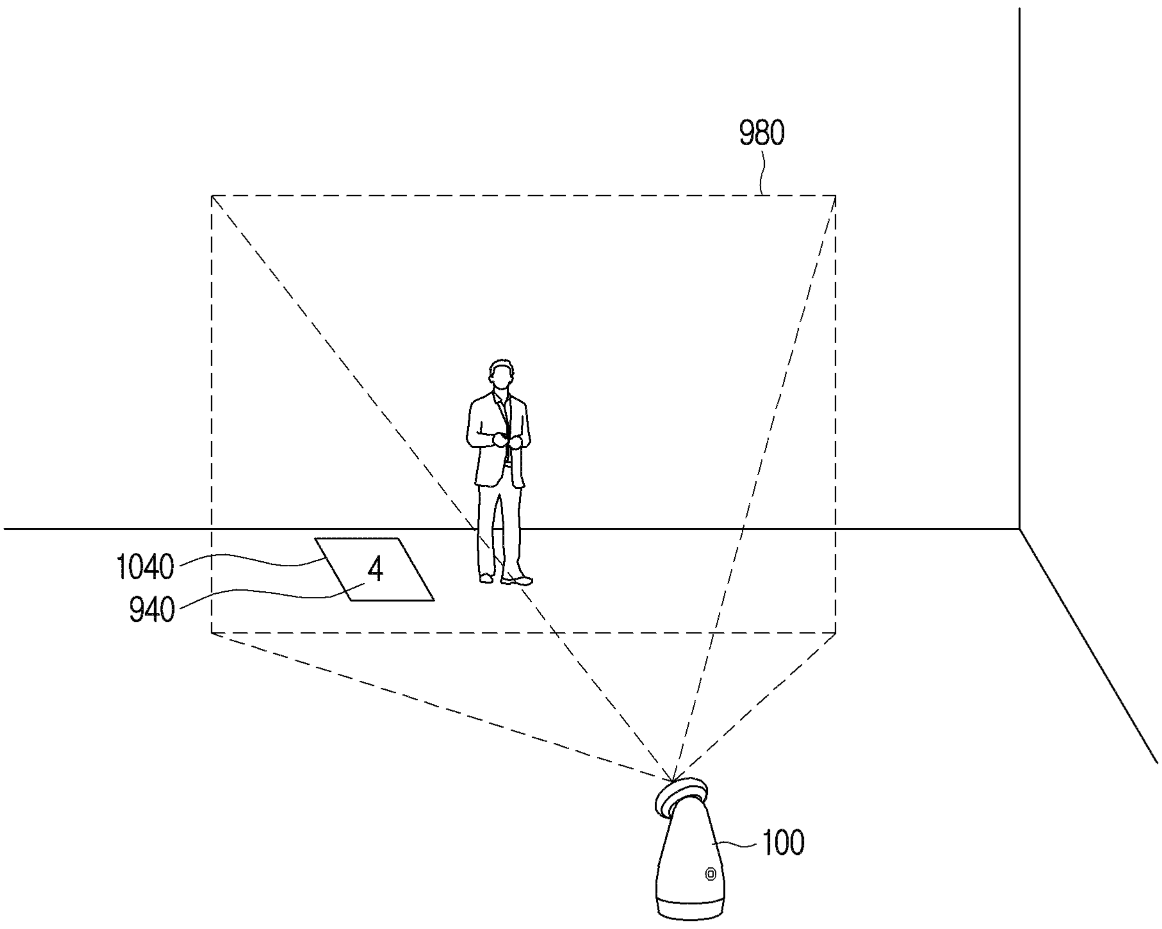

Referring to FIG. 10D, the processor 143 may control the projector 110 to project the image 980 including the fourth sub image 940. At this time, when the image 980 is projected, the fourth sub image 940 may be positioned at a fourth candidate projection area 1040.

The processor 143 may identify a candidate projection area selected based on a user input from among the plurality of candidate projection areas as the projection area (S280).

The user input may be input in various methods.

According to one or more embodiments, the processor 143 may receive a voice signal for the user voice. For example, the processor 143 may convert, based on a voice signal for the user voice being received, the voice signal to text, and identity the indicator included in the user voice based on the text. The processor 143 may identify a candidate projection area having the identified indicator from among the plurality of candidate projection areas as the projection area.

According to one or more embodiments, the processor 143 may receive a user input using gesture recognition. For example, the processor 143 may obtain an image in which the user is captured using the sensor 120, and obtain 3-dimensional coordinate values of a first point and a second point of a body part of the user by analyzing the image. At this time, the first point may be an elbow of the user, and the second point may be a wrist of the user.

Further, the processor 143 may identify a vector corresponding to the body part of the user based on the 3-dimensional coordinate values of the first point and the second point. For example, the processor 143 may obtain the vector based on the 3-dimensional coordinate values of the first point and the second point. At this time, a starting point of the vector may be the 3-dimensional coordinate values of the first point, and an ending point of the vector may be the 3-dimensional coordinate values of the second point. Further, the processor 143 may identify a candidate projection area present at a direction to which the vector is facing from among the plurality of candidate projection areas as the projection area based on the 3-dimensional coordinate values of the vector and the plurality of candidate projection areas. For example, the processor 143 may identify a point at which the vector and the plane in the user surroundings cross, and identify a distance between the identified point and a center point of each of the plurality of candidate projection areas. The processor 143 may identify a candidate projection area having the shortest distance from among the plurality of candidate projection areas as the candidate projection area present at the direction the vector is facing based on the identified distances.

The processor 143 may project an image content at the projection area using the projector 110 (S290).

The projection area may include an area at which the image content is provided to the user.

For example, the processor 143 may control the projector 110 to project an image content corresponding to the user input at the projection area.

According to one or more embodiments, the processor 143 may convert, based on the voice signal for the user voice being received, the voice signal to text, and obtain information on a user intent by analyzing a meaning of the text. The processor 143 may obtain an image content corresponding to the user intent, and control the projector 110 to project the image content at the projection area.

For example, the processor 143 may obtain, if the user intent is associated with a search (or request) of the image content, a keyword by analyzing the text, and search for an image content associated with the keyword. At this time, the processor 143 may search for the image content associated with the keyword from among a plurality of image contents stored in the memory 142. In addition, the processor 143 may obtain the image content associated with the keyword from a server that provides a streaming service. In addition, the processor 143 may obtain the image content associated with the keyword by requesting a search on the keyword from websites, search engines, and the like.

For example, the image content may include various image content such as television programs, movies, dramas, or the like. In addition, the image content may include various information such as weather, time, and the like or various information associated with a service provided within a space in which the robot 100 is positioned, advertisement pictures, and the like.

As described above, the robot 100 may receive user inputs through interactions with the user, and project an image content corresponding to the user input at the user surroundings. In the disclosure, the user may be described as a subject of interaction.

For example, the processor 143 may match, using a transform matrix, an image content to an area corresponding to the projection area from the image to be projected by the projector 110, and control the projector 110 to project the image included with the image content. At this time, when the image is projected, the image content included with the image may be projected at the projection area.

Figure 11:
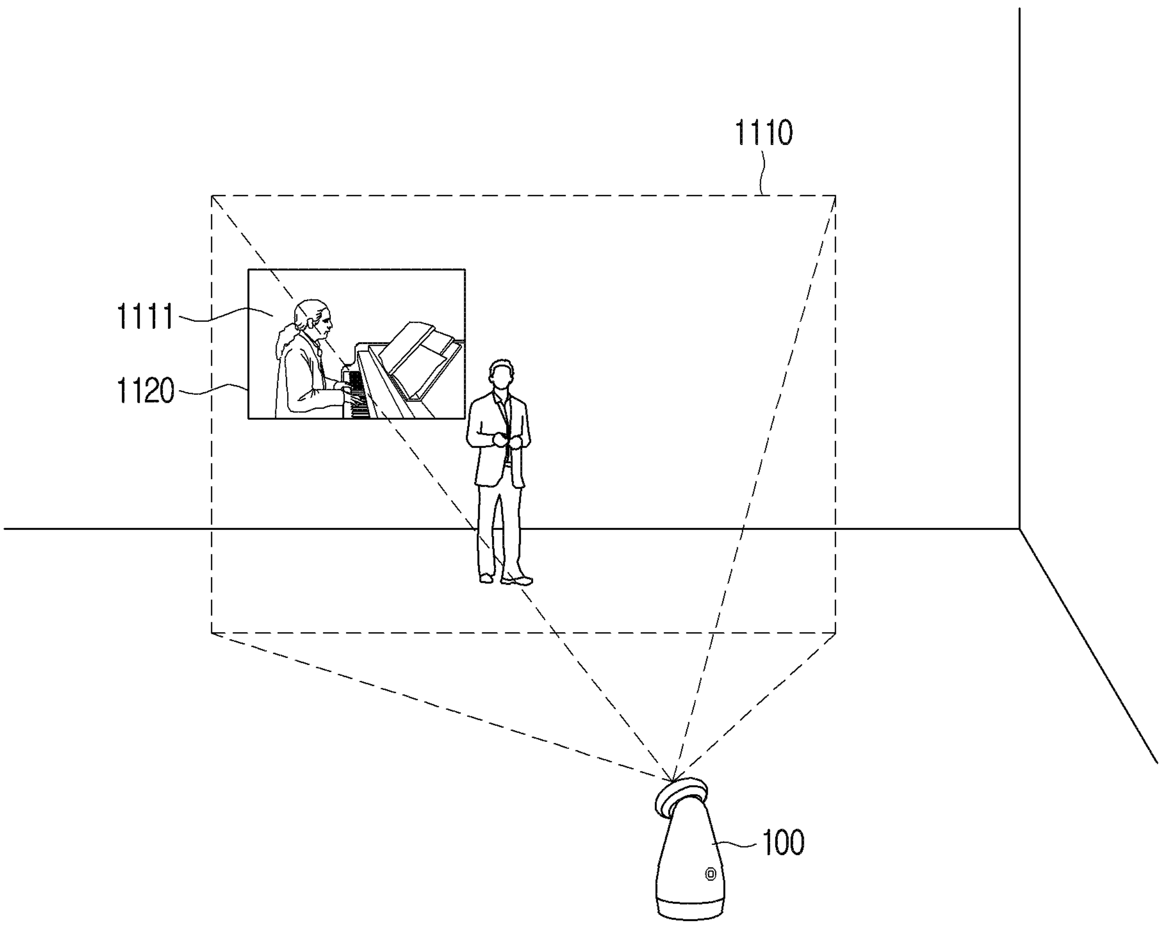
FIG. 11 is a diagram illustrating an example of an operation in which a robot is configured to project an image content at a projection area according to one or more embodiments.

For example, it may be assumed that the first candidate projection area from among the plurality of candidate projection areas (e.g., 512 of FIG. 5B) has been determined as the projection area. The processor 143 may use the transform matrix $H_1$ and match to the area corresponding to the first candidate projection area from the image to be projected by the projector 110. Further, referring to FIG. 11, the processor 143 may control the projector 110 to project an image 1110 including an image content 1111. At this time, when the image 1110 is projected, the image content 1111 may be positioned at a first candidate projection area 1120.

Meanwhile, in the above-described example, when consecutively displaying information on the priority order of the plurality of candidate projection areas in the plurality of candidate projection areas, images including indicators such as numbers or characters have been described as being projected, but is not limited to the above.

The processor 143 may control the projector 110 to consecutively project an image according to a user input.

At this time, the image may include a sub image which is to be projected at a candidate projection area. The sub image may be a single color, and may not include indicators corresponding to the priority order.

Figure 12A:
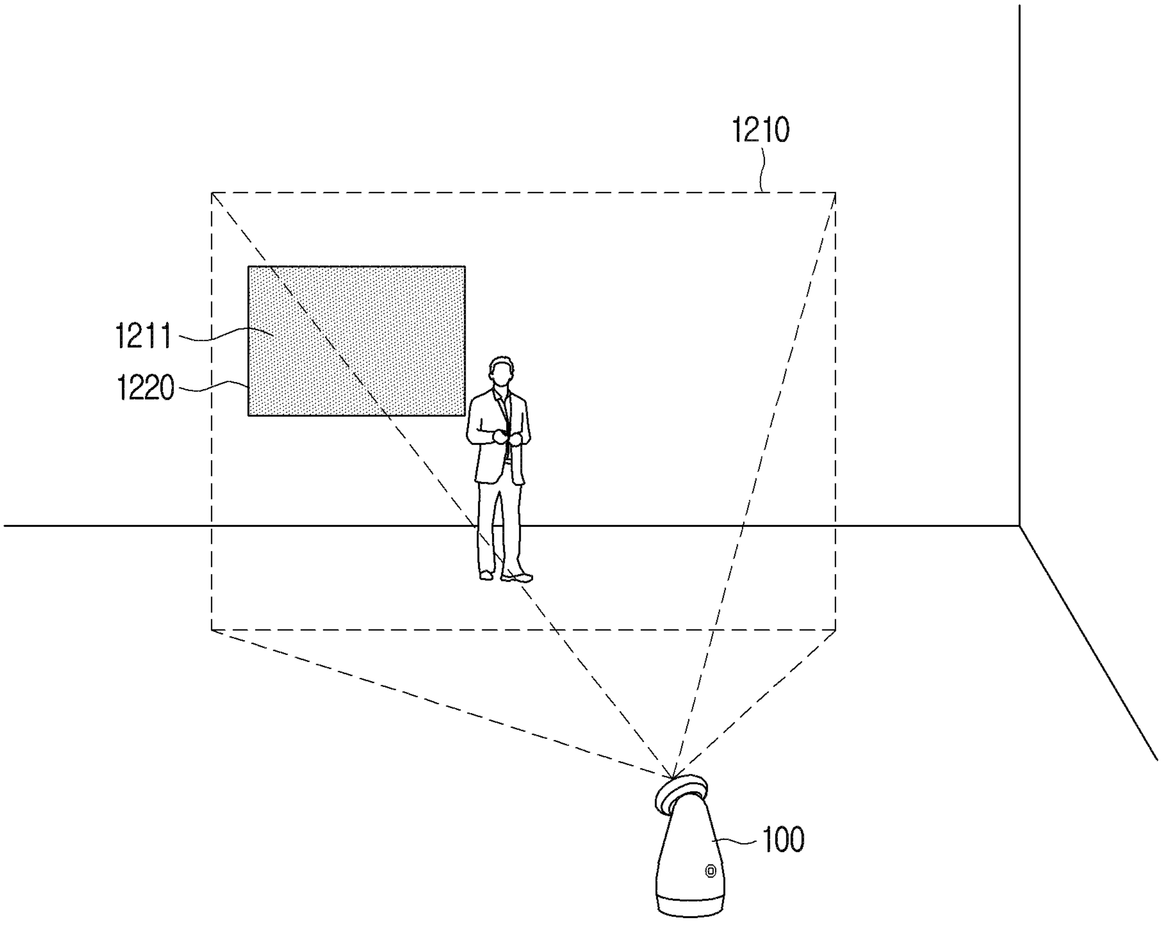
FIG. 12A, FIG. 12B, FIG. 12C, and FIG. 12D are diagrams illustrating an example of an operation in which a robot is configured to project a plurality of images according to one or more embodiments.

For example, the processor 143 may identify, based on the priority order of the plurality of candidate projection areas, a candidate projection area with the highest priority order, and control the projector 110 to project an image corresponding to the identified candidate projection area. For example, referring to FIG. 12A, the processor 143 may control the projector 110 to project an image 1210 including a sub image 1211. At this time, when the image 1210 is projected, the sub image 1211 may be positioned at a first candidate projection area 1220.

The processor 143 may receive the user input while the image is being projected, and control the projector 110 to project an image corresponding to the candidate projection area with the next highest priority order based on the user input, or identify the candidate projection area at which the sub image is currently projected as the projection area.

For example, the processor 143 may convert, based on a voice signal for the user voice being received, the voice signal to text, and obtain information on the user intent by analyzing the meaning of the text. The processor 143 may control the projector 110 to project the image corresponding to the candidate projection area with the next highest priority order based on the user intent, or identify the candidate projection area at which the sub image is currently projected as the projection area.

Figure 12B:
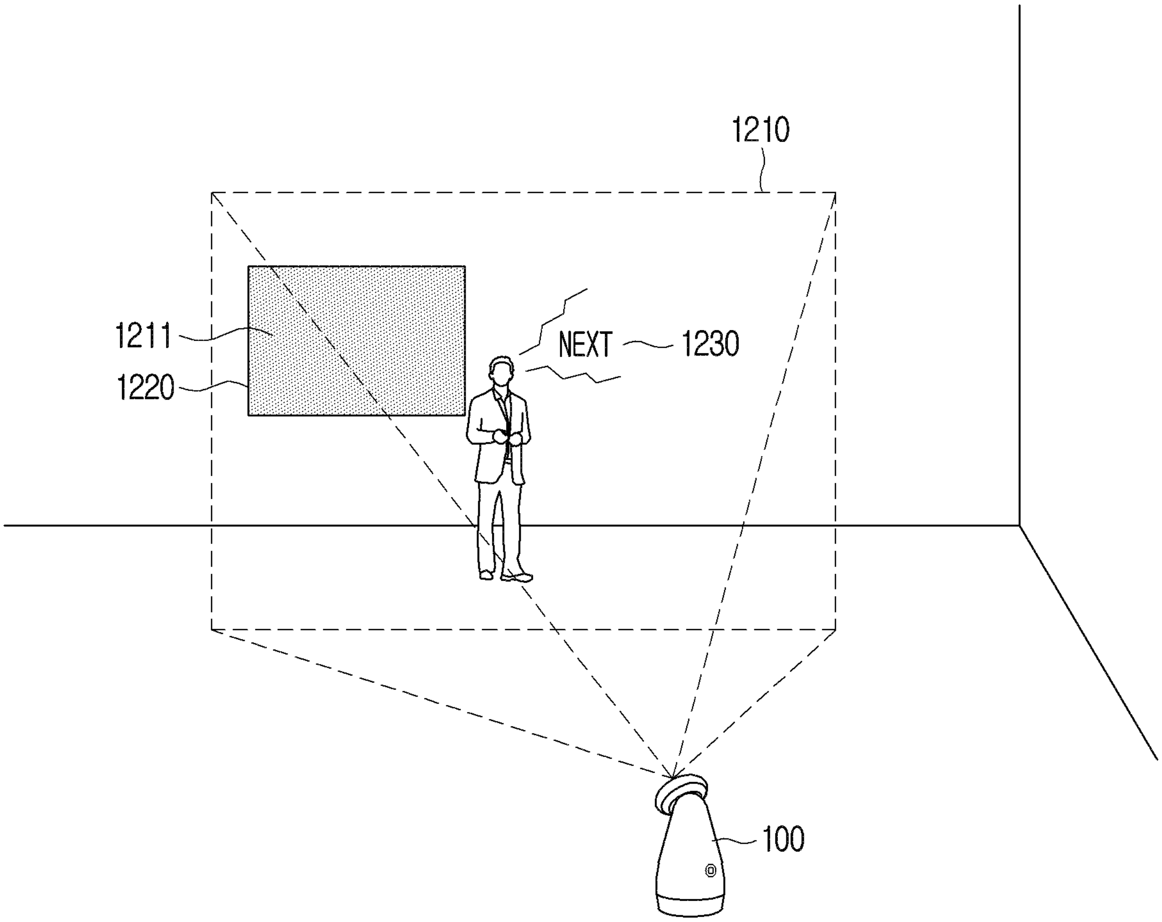
Figure 12C:
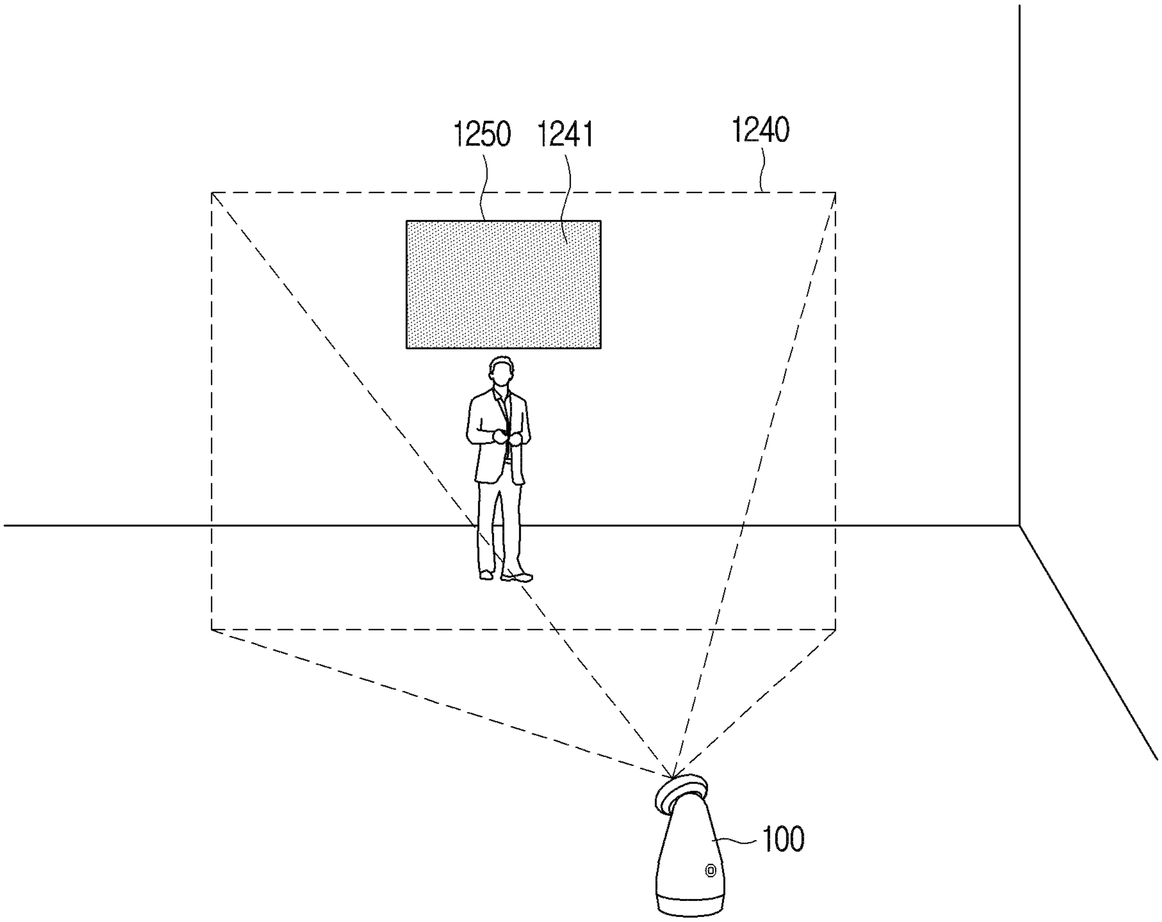

For example, referring to FIG. 12B, the user may utter a voice such as “next” 1230 while the image 1210 is being projected. The processor 143 may receive the voice signal, and identify the intent of the user voice by converting the voice signal to text. The processor 143 may identify the user voice such as “next” 1230 as including an intent requesting for an image corresponding to the candidate projection area with the next highest priority to be projected. In this case, the processor 143 may identify, based on the priority order of the plurality of candidate projection areas, a candidate projection area having the next highest priority order after the candidate projection area at which the sub image is currently being projected, and control the projector 110 to project the image corresponding to the identified candidate projection area. For example, referring to FIG. 12C, the processor 143 may control the projector 110 to project an image 1240 including a sub image 1241. At this time, when the image 1240 is projected, the sub image 1241 may be positioned at a second candidate projection area 1250.

Figure 12D:
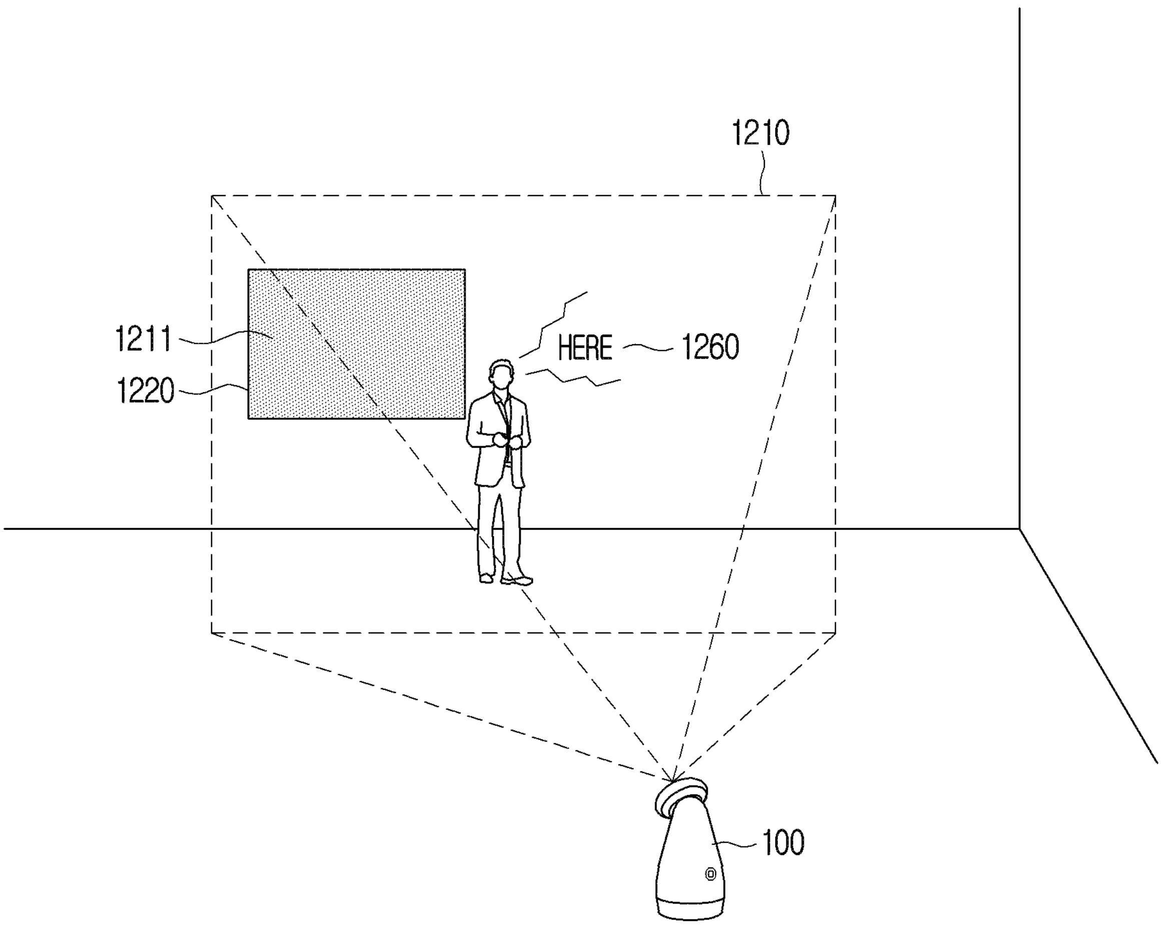

For example, as in FIG. 12D, the user may utter a voice such as “here” 1260 while the image 1210 is being projected. The processor 143 may receive the voice signal, and identify the intent of the user voice by converting the voice signal to text. The processor 143 may identify the user voice such as “here” 1260 as including an intent to select the candidate projection area at which the sub image is currently being projected as the projection area. In this case, the processor 143 may identify the first candidate projection area 1220 at which the sub image 1211 is projected as the projection area.

As described above, the processor 143 may project images corresponding to the candidate projection area one by one, and determine a candidate projection area from among the plurality of candidate projection areas based on the user input.

As described above, the robot 100 may identify the projection area from the user surroundings.

For example, the robot 100 may obtain information using the sensor 120 (e.g., LiDAR sensor, camera, etc.), and recognize a surrounding environment of the robot 100 by exploring the surroundings of the robot 100 using the obtained information. The robot 100 recognizing the surrounding environment may include the robot 100 obtaining information on a direction at which an object is positioned in the surroundings of the robot 100, a distance between the robot 100 and the object, and the like. In addition, the robot 100 may detect the user from an image obtained by using the sensor 120, and track the detected user. For example, the robot 100 may track the user comparing characteristic information (e.g., sizes, colors, shapes, outlines, etc. of users) of the users between image frames, and add an ID for each user to differentiate the users.

At this time, the processor 143 may identify, based on a voice signal including a trigger word being received, the user who uttered the voice signal, and identify the projection area from the identified user surroundings.

The trigger word may include a word for calling the robot 100. The trigger word may be a pre-set word, or a word selected by a user input from among a plurality of pre-set words.

For example, the processor 143 may convert, based on the voice signal for the user voice being received, the voice signal to text, and identify whether the trigger word is included in the user voice by analyzing the text.

Further, the processor 143 may identify, based on the trigger word being identified as included in the user voice, the user who uttered the voice including the trigger word, and identify the projection area from the identified user surroundings.

According to one or more embodiments, the robot 100 may include a plurality of microphones. The processor 143 may identify, based on a voice signal being received through the plurality of microphones, the user who uttered the voice by identifying a direction from which the user voice is received. For example, the processor 143 may identify a direction of a sound source using sound localization, and identify the user positioned at the identified direction as the user who uttered the trigger word. Further, the processor 143 may identify the projection area from the user surroundings using the image included with the user who uttered the trigger word. In this case, the processor 143 may rotate the robot 100 by controlling the driving part 130 for a view of the robot 100 (e.g., view of the sensor 120) to face the user who uttered the trigger word, and obtain an image in which the user who uttered the trigger word is included using the sensor 120.

According to one or more embodiments, the processor 143 may identify the user who uttered the trigger word based on the image obtained by using the sensor 120.

For example, the processor 143 may detect an outline of an object from the image, and calculate a probability value indicating a degree to which a shape of a pre-stored object (e.g., a mouth) matches with the detected outline. Further, the processor 143 may identify an object having a highest probability value from among the probability values calculated for the outline of the object as the mouth of the user. In this case, the processor 143 may identify, based on a voice signal including the trigger word being identified as received, the user whose mouth shape is changed from among the image frames obtained from a time-point at which the voice signal is received (or a time section from the time-point at which the voice signal is received to a time-point at which the voice signal is received from a time-point prior to a pre-set time), and identify the identified user as the user who uttered the trigger word. Further, the processor 143 may identify the projection area from the user surroundings using the image in which the user who uttered the trigger word is included.

Figure 13:
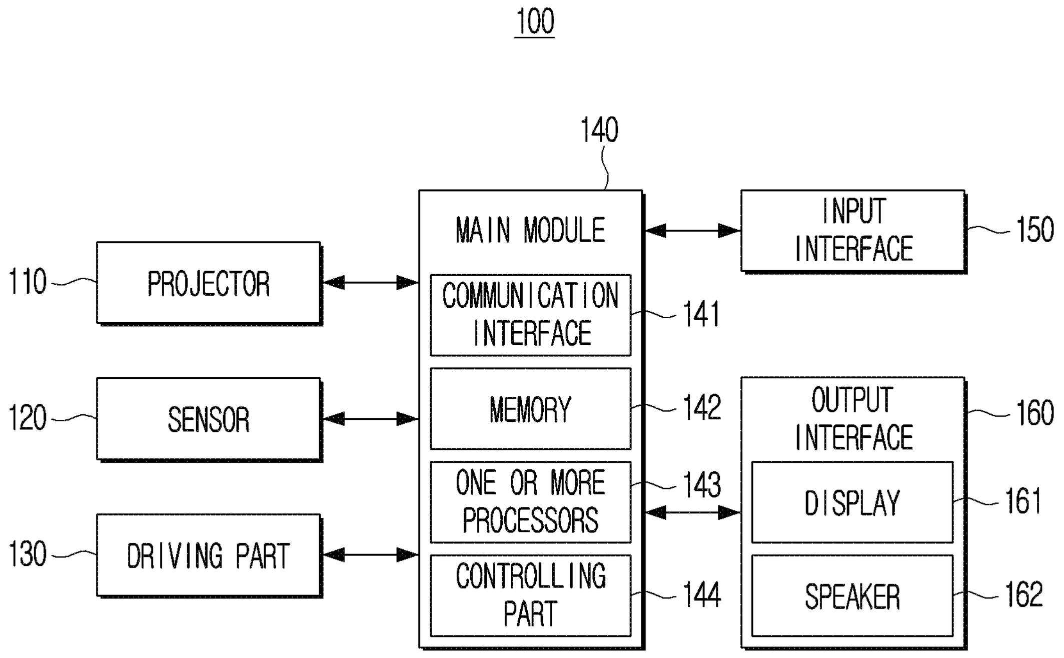
FIG. 13 is a block diagram illustrating a configuration of a robot according to one or more embodiments.

FIG. 13 is a block diagram illustrating a configuration of a robot according to one or more embodiments.

Referring to FIG. 13, the robot 100 may include the projector 110, the sensor 120, the driving part 130, the main module 140, an input interface 150, and an output interface 160. Further, the configurations described above are examples, and new configurations may be added. Meanwhile, detailed descriptions for configurations may overlap with the configurations shown in FIG. 1A, and therefore, for additional implementation details of the one or more embodiments illustrated in FIG. 13, reference may be made to FIG. 1A and the corresponding descriptions.

The sensor 120 may detect a structure of a space or an object. The object may include a wall of the space and obstacles. The obstacles may include various objects present in the space such as, for example, and without limitation, furniture, home appliances, remote controllers, keys, humans, pets, and the like. In addition, information obtained by the sensor 120 may be used in generating a map of the space.

The sensor 120 may include a LiDAR sensor, an obstacle detection sensor, and a travel detection sensor. The LiDAR sensor may output a laser in a 360 degree direction, analyze a difference in time taken for the laser to be reflected from the object and return, a signal intensity of the received laser, and the like when the reflected laser is received from the object, and obtain geometry information on the space. The geometry information may include a position, a distance, a direction, and the like of the object. The LiDAR sensor may provide the obtained geometry information to the processor 143.

The obstacle detection sensor may detect obstacles in the surroundings of the robot. For example, the obstacle detection sensor include at least one from among an ultrasonic sensor, an infrared sensor, a radio frequency (RF) sensor, a geomagnetic sensor, and a position sensitive device (PSD) sensor. The obstacle detection sensor may detect an obstacle present at a front direction, a rear direction a side surface, or on a moving path of the robot. The obstacle detection sensor may provide detected obstacle information to the processor 143.

The travel detection sensor may detect the traveling of the robot 100. For example, the travel detection sensor may include at least one from among a gyro sensor, a wheel encoder, or an acceleration sensor. The gyro sensor may detect a rotation direction and a rotation angle of the robot 100. The wheel encoder may detect a rotation number of a wheel of the robot 100. The acceleration sensor may detect a speed change of the robot 100. The travel detection sensor may provide detected travel information to the processor 143.

For example, the processor 143 may generate a map of the space using information obtained through the sensor 120. The map may be generated in an initial exploring process of the space. For example, the processor 143 may obtain geometry information on the space by exploring the space using the LiDAR sensor, and generate a map of the space using the geometry information. In this case, the map may include a grid map.

In addition, the processor 143 may identify the position of the robot 100 on the map using simultaneous localization and mapping (SLAM).

For example, the processor 143 may obtain geometry information of the space using the LiDAR sensor, and identify the position of the robot 100 on the map by comparing the obtained geometry information with pre-stored geometry information, or comparing the obtained geometry information. However, the disclosure is not limited to the example above, and the processor 143 may identify the position of the robot 100 on the map through SLAM which uses the camera, for example.

In addition, the processor 143 may control the traveling of the robot 100 using information obtained through the sensor 120.

For example, the processor 143 may control the driving part 130 for the robot 100 to travel in a space using a map stored in the memory 142. Further, the processor 143 may obtain information using the sensor 120 while the robot 100 is traveling the space, and detect an obstacle in the surroundings of the robot 100 using the obtained information. The processor 143 may determine, when an obstacle is detected, a traveling pattern of the robot 100 such as moving straight and rotating, and control the driving part 130 for the robot 100 to travel avoiding the obstacles according to the determined traveling pattern. In addition, the processor 143 may identify travel information such as a moving speed of the robot 100, a distance which a cleaning robot 100 has traveled, and the like using the information obtained by the sensor 120, and update the position of the robot 100 on the map based on the travel information.

The input interface 150 may include circuitry. The input interface 150 may receive the user input, and transfer the user input to the processor 143. For example, the input interface 150 may receive various user inputs for setting or selecting various functions supported by the robot 100.

The input interface 150 may include input devices of various types.

According to one or more embodiments, the input interface 150 may include a physical button. The physical button may include a function key or a dial button. The physical button may be implemented as one or more keys.

According to one or more embodiments, the input interface 150 may receive the user input using a touch method. For example, the input interface 150 may be implemented with a touch screen capable of performing a function of a display 161.

According to one or more embodiments, the input interface 150 may receive a voice signal for the user voice using a microphone. In this case, the input interface 150 may include one or more microphones. The processor 143 may perform a function corresponding to the user voice using the voice signal.

The output interface 160 may include the display 161 and a speaker 162.

The display 161 may display various screens. The processor 143 may display various notifications, messages, information, and the like associated with an operation of the robot 100 in the display 161.

The display 161 may be implemented as a display that includes a self-emissive device or a display including a non-emissive device and a backlight. For example, the display 161 may be implemented as a display of various forms such as, for example, and without limitation, a Liquid Crystal Display (LCD), an Organic Light Emitting Diodes (OLED) display, a Light Emitting Diodes (LED) display, a micro LED display, a mini LED display, a Quantum dot light-emitting diodes (QLED) display, and the like.

The speaker 162 may output an audio signal. The processor 143 may output, through the speaker 162, warning sounds, notification messages, response messages corresponding to user input, and the like associated with an operation of the robot 100.

Figure 14:
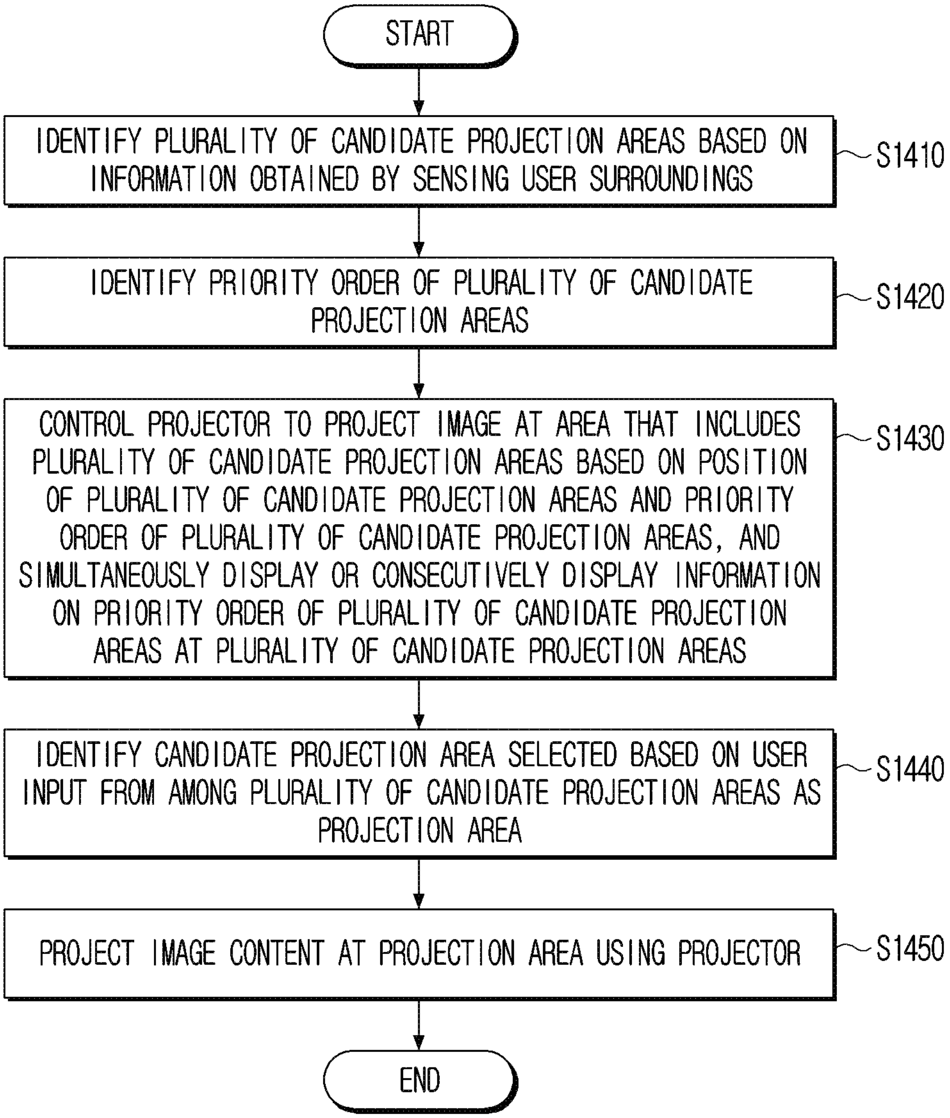
FIG. 14 is a flowchart illustrating a method for projecting an image by a robot according to one or more embodiments.

FIG. 14 is a flowchart illustrating a method for projecting an image by a robot according to one or more embodiments.

The robot may identify the plurality of candidate projection areas based on information obtained by sensing the user surroundings (S1410).

The robot may identify the priority order of the plurality of candidate projection areas (S1420).

The robot may control the projector to project an image at an area that includes the plurality of candidate projection areas based on the positon of the plurality of candidate projection areas and the priority order of the plurality of candidate projection areas, and simultaneously display or consecutively display information on the priority order of the plurality of candidate projection areas at the plurality of candidate projection areas (S1430).

The robot may identify a candidate projection area selected based on the user input from among the plurality of candidate projection areas as the projection area (S1440).

The robot may project an image content at the projection area using the projector (S1450).

In operation S1430, the robot may identify a plurality of areas corresponding to the plurality of candidate projection areas in the image to be projected at the area based on the position of the plurality of candidate projection areas, and control the projector to project the image in which the plurality of sub images is included in the plurality of areas. Each of the plurality of sub images may include indicators corresponding to the priority order of each of the plurality of candidate projection areas. The indicator may include a number indicating the priority order of the candidate projection area.

In operation S1430, the robot may identify an area corresponding to the candidate projection area from the image to be projected at the area based on the position of the candidate projection area for each of the candidate projection areas, and control the projector to consecutively project the plurality of images in which each sub image is included in each area. Each sub image may include the indicator corresponding to the priority order of each of the plurality of candidate projection areas. The indicator may include a number indicating the priority order of the candidate projection areas.

In operation S1420, the robot may identify the priority order of the plurality of candidate projection areas based on the size of each of the plurality of candidate projection areas and the distance between the user and each of the plurality of candidate projection areas.

In operation S1410, the robot may generate a 3-dimensional map of the user surroundings based on information obtained by sensing the user surroundings using the sensor, identify a plane from the user surroundings based on the 3-dimensional map, identify a plurality of areas with an aspect ratio that is the same as the aspect ratio of the projection image on the identified plane, and identify a plurality of candidate projection areas from among the plurality of areas based on the characteristics of the plurality of areas.

In operation S1410, the robot may identify, based on an area in which saturation is greater than or equal to the threshold value from among the plurality of areas being identified based on the RGB value of the points included in the plurality of areas, the remaining area excluding the identified area from among the plurality of areas as the plurality of candidate projection areas.

In operation S1410, the robot may obtain the image using the sensor, identify the rotation angle range of the sensor based on the position of the user identified from the image and the field of view of the sensor, and obtain information using the sensor while the sensor is rotating within the rotation angle range.

In this case, the robot may obtain the bounding box for the user from the obtained image, identify the pixel distance between the center pixel of the obtained image and the pixel of the bounding box, and identify the rotation angle range of the sensor based on the focal distance of the sensor and the pixel distance.

Meanwhile, according to one or more embodiments, the various embodiments described above may be implemented with software including instructions stored in a machine-readable storage media (e.g., computer). The machine may call an instruction stored in the storage medium, and as a device operable according to the called instruction, may include an electronic device according to the above-mentioned embodiments. Based on a command being executed by the processor, the processor may directly or using other elements under the control of the processor perform a function corresponding to the command. The command may include a code generated by a compiler or executed by an interpreter. The machine-readable storage medium may be provided in a form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments, a method according to the various embodiments described above may be provided included a computer program product. The computer program product may be exchanged between a seller and a purchaser as a commodity. The computer program product may be distributed in a form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, according to one or more embodiments, the various embodiments described above may be implemented in a recordable medium which is readable by computer or a device similar to the computer using software, hardware, or the combination thereof. The embodiments described herein may be implemented by the processor itself. According to a software implementation, embodiments such as procedures and functions described herein may be implemented with separate software modules. Each software may perform one or more of the functions and operations described herein.

Meanwhile, computer instructions for performing processing operations in the device according to the various embodiments described above may be stored in a non-transitory computer-readable medium. The computer instructions stored in this non-transitory computer-readable medium may cause a device to perform a processing operation in devices according to the above-described various embodiments when executed by a processor of the device. The non-transitory computer readable medium may refer to a medium that stores data semi-permanently rather than storing data for a very short time, such as a register, a cache, a memory, or the like, and is readable by a device. Examples of the non-transitory computer readable medium may include, for example, and without limitation, a compact disc (CD), a digital versatile disc (DVD), a hard disc, a Blu-ray disc, a USB, a memory card, a ROM, and the like.

In addition, each of the elements (e.g., a module or a program) according to the various embodiments described above may be formed of a single entity or a plurality of entities, and other sub-elements may be further included in the various embodiments. A portion of the elements (e.g., modules or programs) may be integrated into one entity to perform the same or similar functions performed by each of the relevant elements prior to integration. Operations performed by a module, a program, or other element, in accordance with the various embodiments, may be executed sequentially, in parallel, repetitively, or in a heuristically manner, or at least a portion of the operations may be performed in a different order, or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A robot, comprising:
a projector;
a sensor;
memory storing instructions; and
one or more processors,
wherein the instructions that, when collectively or individually executed by the one or more processors, cause the robot to:
identify a plurality of candidate projection areas based on first information obtained by sensing surroundings of a user via the sensor;
identify a priority order of the plurality of candidate projection areas;
control the projector to:
project a first image at an area comprising the plurality of candidate projection areas, based on a plurality of positions of the plurality of candidate projection areas and the priority order; and
display second information on the priority order at the plurality of candidate projection areas;
identify a candidate projection area selected based on a user input from among the plurality of candidate projection areas as a projection area; and
project image content at the projection area via the projector,
wherein the one or more processors are configured to execute the instructions to cause the robot to:
generate a 3-dimensional map of the surroundings based on the first information;
identify a plane from the surroundings based on the 3-dimensional map,
identify a plurality of areas with a first aspect ratio matching a second aspect ratio of a projection image on the plane, and identify the plurality of candidate projection areas from among the plurality of areas based on a characteristic of the plurality of areas.

2. The robot of claim 1, wherein the one or more processors are configured to execute the instructions to cause the robot to:

identify, based on the plurality of positions, a plurality of areas of a second image to be projected in the area, the plurality of areas corresponding to the plurality of candidate projection areas; and control the projector to project the second image, wherein the second image comprises a plurality of sub images corresponding to the plurality of areas, and the plurality of sub images comprise a plurality of indicators corresponding to the priority order.

3. The robot of claim 2, wherein the plurality of indicators comprise a plurality of numbers indicating the priority order.

4. The robot of claim 1, wherein the one or more processors are configured to execute the instructions to cause the robot to:

identify, based on the plurality of positions, a plurality of areas corresponding to the plurality of candidate projection areas; and control the projector to consecutively project a plurality of sub images corresponding to the plurality of areas, wherein the plurality of sub images comprise a plurality of indicators corresponding to the priority order.

5. The robot of claim 4, wherein the plurality of indicators comprise a plurality of numbers indicating the priority order.

6. The robot of claim 1, wherein the one or more processors are configured to execute the instructions to cause the robot to identify the priority order based on:

a plurality of sizes of the plurality of candidate projection areas, and a plurality of distances between the user and the plurality of candidate projection areas.

7. The robot of claim 1, wherein the one or more processors are configured to execute the instructions to cause the robot to identify a remaining area excluding an identified area from among the plurality of areas as the plurality of candidate projection areas, wherein a saturation of the identified area is greater than or equal to a threshold value from, and wherein the identified area is determined based on a RGB value of a plurality of points in the plurality of areas.

8. The robot of claim 1, wherein the one or more processors are configured to execute the instructions to cause the robot to:

obtain a third image via the sensor;

identify a position of the user in the third image;

identify a rotation angle range of the sensor based on the position of the user and a field of view of the sensor; and obtain the first information via the sensor while the sensor rotates within the rotation angle range.

9. The robot of claim 8, wherein the one or more processors are configured to execute the instructions to cause the robot to:

obtain a bounding box for the user based on the third image;

identify a pixel distance between a center pixel of the third image and a pixel of the bounding box; and identify the rotation angle range based on a focal distance of the sensor and the pixel distance.

10. A method for projecting an image by a robot including a projector, the method comprising:

identifying a plurality of candidate projection areas based on first information obtained by sensing surroundings of a user via a sensor;

identifying a priority order of the plurality of candidate projection areas;

projecting a first image, via the projector, at an area comprising the plurality of candidate projection areas, based on a plurality of positions of the plurality of candidate projection areas and the priority order;

displaying second information on the priority order at the plurality of candidate projection areas;

identifying a candidate projection area selected based on a user input from among the plurality of candidate projection areas as a projection area; and projecting image content at the projection area via the projector, wherein the identifying the plurality of candidate projection areas comprises:

generating a 3-dimensional map of the surroundings based on the first information;

identifying a plane from the surroundings based on the 3-dimensional map;

identifying a plurality of areas with a first aspect ratio matching a second aspect ratio of a projection image on the plane; and identifying the plurality of candidate projection areas from among the plurality of areas based on a characteristic of the plurality of areas.

11. The method of claim 10, wherein the displaying comprises:

identifying, based on the plurality of positions, a plurality of areas of a second image to be projected in the area, the plurality of areas corresponding to the plurality of candidate projection areas; and controlling the projector to project the second image, wherein the second image comprises a plurality of sub images corresponding to the plurality of areas, and the plurality of sub images comprise a plurality of indicators corresponding to the priority order.

12. The method of claim 11, wherein the plurality of indicators comprise a plurality of numbers indicating the priority order.

13. The method of claim 10, wherein the displaying comprises:

identifying, based on the plurality of positions, a plurality of areas corresponding to the plurality of candidate projection areas; and controlling the projector to consecutively project a plurality of sub images corresponding to the plurality of areas, wherein the plurality of sub images comprise a plurality of indicators corresponding to the priority order.

14. The method of claim 13, wherein the plurality of indicators comprise a plurality of numbers indicating the priority order.

15. The method of claim 10, wherein the identifying the priority order comprises identifying the priority order based on:

a plurality of sizes of the plurality of candidate projection areas, and a plurality of distances between the user and the plurality of candidate projection areas.

16. The method of claim 10, wherein the identifying the plurality of candidate projection areas comprises identifying a remaining area excluding an identified area from among the plurality of areas as the plurality of candidate projection areas, wherein a saturation of the identified area is greater than or equal to a threshold value, and wherein the identified area is determined based on a RGB value of a plurality of points in the plurality of areas.

17. The method of claim 10, wherein the obtaining the first information comprises:

obtaining a third image via the sensor;

identifying a position of the user in the third image;

identifying a rotation angle range of the sensor based on the position of the user and a field of view of the sensor; and obtaining the first information via the sensor while the sensor rotates within the rotation angle range.

18. A non-transitory computer-readable recording medium having instructions recorded thereon, that, when executed by one or more processors of a robot including a projector, cause the robot to:

identify a plurality of candidate projection areas based on first information obtained by sensing surroundings of a user via a sensor;

identify a priority order of the plurality of candidate projection areas;

control the projector to:

project a first image at an area comprising the plurality of candidate projection areas, based on a plurality of positions of the plurality of candidate projection areas and the priority order; and display second information on the priority order at the plurality of candidate projection areas;

identify a candidate projection area selected based on a user input from among the plurality of candidate projection areas as a projection area; and project image content at the projection area via the projector, wherein the identifying the plurality of candidate projection areas comprises:

generating a 3-dimensional map of the surroundings based on the first information;

identifying a plane from the surroundings based on the 3-dimensional map;

identifying a plurality of areas with a first aspect ratio matching a second aspect ratio of a projection image on the plane; and identifying the plurality of candidate projection areas from among the plurality of areas based on a characteristic of the plurality of areas.

* * * * *